US006983206B2

(12) United States Patent
Conner et al.

(10) Patent No.: US 6,983,206 B2
(45) Date of Patent: Jan. 3, 2006

(54) GROUND OPERATIONS AND IMMINENT LANDING RUNWAY SELECTION

(75) Inventors: Kevin J Conner, Kent, WA (US); Scott R. Gremmert, Redmond, WA (US); Yasuo Ishihara, Kirkland, WA (US); Ratan Khatwa, Sammamish, WA (US); John J. Poe, Woodinville, WA (US); James J. Corcoran, III, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 176 days.

(21) Appl. No.: 10/440,461

(22) Filed: May 15, 2003

(65) Prior Publication Data

US 2004/0030465 A1 Feb. 12, 2004

Related U.S. Application Data

(63) Continuation-in-part of application No. 09/800,175, filed on Mar. 6, 2001, now Pat. No. 6,606,563.
(60) Provisional application No. 60/381,029, filed on May 15, 2002, and provisional application No. 60/381,040, filed on May 15, 2002.

(51) Int. Cl.
    *G08B 23/00* (2006.01)

(52) U.S. Cl. ........................ 701/301; 701/120; 340/947; 340/972; 342/29; 342/65

(58) Field of Classification Search .................. 701/301, 701/16, 18, 4–6, 17, 122, 120; 340/970, 384 R, 340/947, 951, 948, 972; 342/29, 65, 454
See application file for complete search history.

(56) References Cited

U.S. PATENT DOCUMENTS

| 3,925,751 | A | * | 12/1975 | Bateman et al. | ............ 340/967 |
| 4,646,244 | A | * | 2/1987 | Bateman et al. | ............ 701/301 |
| 4,914,436 | A | * | 4/1990 | Bateman et al. | ............ 340/970 |
| 5,839,080 | A | | 11/1998 | Muller et al. | |
| 6,216,064 | B1 | | 4/2001 | Johnson et al. | |
| 6,304,800 | B1 | | 10/2001 | Ishihara et al. | |
| 6,694,249 | B1 | * | 2/2004 | Anderson et al. | ........... 701/120 |
| 2002/0089433 | A1 | * | 7/2002 | Bateman et al. | ............ 340/970 |

FOREIGN PATENT DOCUMENTS

| JP | 11175900 A | * | 7/1999 |
| WO | WO 0038131 A | | 6/2000 |

\* cited by examiner

*Primary Examiner*—Thomas G. Black
*Assistant Examiner*—Tuan C To
(74) *Attorney, Agent, or Firm*—Charles J. Rupnick, Attorney at Law

(57) ABSTRACT

A method for locating aircraft with respect to airport runways and taxiways, generating and annunciating situational awareness advisories as a function of aircraft state parameters relative to a determination of the aircraft location.

41 Claims, 14 Drawing Sheets

TABLE — 400

| BYTE | BIT 7 | BIT 6 | BIT 5 | BIT 4 | BIT 3 | BIT 2 | BIT 1 | BIT 0 |
|---|---|---|---|---|---|---|---|---|
| 0 | A/C ID 2 BITS 5, 4 | | AIRCRAFT ID 1ST BYTE (402) ||||||
| 1 | A/C ID BYTE 3 BITS 5, 4, 3, 2 |||| A/C ID BYTE 2 BITS 3, 2, 1, 0 ||||
| 2 | AIRCRAFT ID BYTE 4 |||||| A/C ID 3 BITS 1,0 ||
| 3 | ONRWY | INAIR | AIRCRAFT ID BYTE 5 ||||||
| 4 | CROSSING | M/T FLAG | AIRCRAFT ID BYTE 6 ||||||
| 5 | APT ID 2 BITS 5, 4 | | AIRPORT ID 1ST BYTE (402) ||||||
| 6 | AIRPORT ID BYTE 3 BITS 5, 4, 3, 2 |||| AIRPORT ID BYTE 2 BITS 3, 2, 1, 0 ||||
| 7 | AIRPORT ID BYTE 4 |||||| APT ID 3 BITS 1,0 ||
| 8 | RUNWAY HDG (404) |||| RWY ID (406) ||||
| 9 | ALTITUDE (408) ||||||||
| 10 | GNDSPD (410) ||||||||
| 11 | TRACK (412) |||||| SPARE ||
| 12 | LATITUDE, LSB (414) ||||||||
| 13 | LATITUDE, BYTE 2 ||||||||
| 14 | LATITUDE, MSB ||||||||
| 15 | LONGITUDE, LSB (414) ||||||||
| 16 | LONGITUDE, BYTE 2 ||||||||
| 17 | LONGITUDE, MSB ||||||||
| 18 | CHECK BYTE (416) ||||||||

*Fig. 13.*

GROUND OPERATIONS AND IMMINENT LANDING RUNWAY SELECTION

This application claims the benefit and is a continuation in part of allowed parent patent application Ser. No. 09/800,175, entitled, "INCURSION ALERTING SYSTEM," filed in the name of James J. Corcoran III on Mar. 6, 2001, now U.S. Pat. No. 6,606,563, and assigned to the assignee of the present application, the present application being a Continuation-In-Part thereof; and further claims the benefit of both U.S. Provisional Application Ser. No. 60/381,029, filed in the names of Kevin J Conner, Scott R. Grennert, Yasuo Ishihara, Ratan Khatwa and John J. Poe on May 15, 2002, the complete disclosure of which is incorporated herein by reference; and U.S. Provisional Application Ser. No. 60/381,040, filed in the name of Kevin J Conner on May 15, 2002, the complete disclosure of which is incorporated herein by reference.

FIELD OF THE INVENTION

The present invention relates to devices, methods and computer program products for facilitating alerting and enhancing situational awareness near airport runways and taxiways, and in particular to devices, methods and computer program products for generating situational awareness advisories and alerts as a function of a position of an installation aircraft relative to airport runways and taxiways.

BACKGROUND OF THE INVENTION

Runway incursions and taxiway transgressions are currently well recognized as major flight safety issues. Runway incursions and taxiway transgressions usually involve an inappropriate entry to either or both of a taxiway and a runway and potentially can result in unsafe separation from other aircraft or ground vehicles. As with any aviation accident or incident, the causal chain of events leading to runway incursions and inappropriate taxiway transgressions is complex. Current data show that these events include consequences such as: take-off or landing from a taxiway; take-off and landing from an incorrect runway; turning onto an incorrect taxiway; unauthorized take-off or landing; unauthorized runway crossing or taxing across an active runway; failure to hold short of a runway prior to departure or unauthorized runway entry; and unauthorized taxiing. Many occurrences of these events involve poor pilot approach or on-the-ground situational awareness that has not been overcome by either current traffic controls or tower instructions. Furthermore, existing "runway picker" algorithms are useless during taxi because they simply select the closest runway endpoint.

SUMMARY OF THE INVENTION

The present invention facilitates advising and enhances situational awareness of airport runways and taxiways that overcomes limitations of the prior art by providing a method for locating aircraft with respect to airport runways and taxiways, generating and annunciating advisories as a function of aircraft state parameters relative to the aircraft location determination.

According to one aspect of the invention, the present invention determines the airport runway that the aircraft on which it is installed (hereinafter the "installation aircraft") is most likely to encounter, whether taxiing, preparing for take-off, or approaching to land. Accordingly, the present invention provides an envelope constructed around a runway as a function of the installation aircraft state parameters, including: ground speed, relative orientation, and phase of flight.

According to another aspect of the invention, the present invention provides an apparatus, method and computer program product for determining whether an aircraft is "on" a runway or taxiway and when it will cross a runway or taxiway, and provides these determinations as advisories without excessive incorrect determinations or nuisance warnings.

According to another aspect of the invention, the present invention provides at periodic altitude callouts during landing upon determining that the landing has not been completed within specified conditions. Additionally, the present invention provides runway distance remaining callouts once additional conditions are satisfied.

According to another aspect of the invention, the present invention determines the position of the aircraft relative to the airport and reports the position on a graphical depiction of the airport and its approaches. Optionally, the present invention additionally reports a velocity vector of the installation aircraft relative to the airport and its approaches.

According to another aspect of the invention, the present invention reports the position and optionally the velocity vector of the installation aircraft by generating a RF broadcast of the information, and receives such information broadcast by other installations of the invention. Additionally, the present invention reports the received information on the graphical depiction of the airport and its approaches.

According to another aspect of the invention, the present invention compares the own installation aircraft position and velocity vector information with the received information, determines potential conflicts in the occupation of a runway, and generates advisories of the potential conflicting situations if not suppressed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 2 through 5 illustrate exemplary augmented runway envelopes computed by one runway selection function of the invention for determining a runway of interest as operated by the airport situational awareness apparatus of FIG. 1, wherein:

FIG. 2 illustrates exemplary augmented runway envelopes relative to two runways for an aircraft taxiing on the ground and heading North at 8 knots, FIG. 3 illustrates exemplary augmented runway envelopes relative to the two runways shown in FIG. 2 for an aircraft taxiing on the ground and heading East at 8 knots, FIG. 4 illustrates exemplary augmented runway envelopes relative to the two runways shown in FIG. 2 for an aircraft taxiing on the ground and heading East at 36 knots, and FIG. 5 illustrates exemplary augmented runway envelopes relative to the two runways shown in FIG. 2 for an airborne aircraft on approach for landing;

FIGS. 6 and 7 illustrate together an alternative embodiment of runway selection operated by the airport situational awareness apparatus for determining a runway of interest while the aircraft is on the ground, wherein:

FIG. 6 illustrates an augmented runway envelope called a "Bounding Box" according to an alternative an on-ground runway selection function of the invention for determining a runway of interest as operated by the airport situational awareness apparatus of FIG. 1, and FIG. 7 illustrates a Track Deviation function of the alternative on-ground runway selection function embodied in an exemplary logic diagram;

FIGS. 9 and 10 illustrate by example an alternative advisory annunciation envelope for use during approach and landing of the aircraft, wherein:

FIG. 9 is a profile view of the alternative annunciation envelope, and

FIG. 10 is a plan view of the alternative annunciation envelope illustrated in FIG. 9;

FIG. 13 is a generally self-explanatory Table that illustrates formatting of a serial data stream for broadcasting installation aircraft position and, optionally, velocity vector, information;

DETAILED DESCRIPTION OF PREFERRED EMBODIMENT

Figure 1:
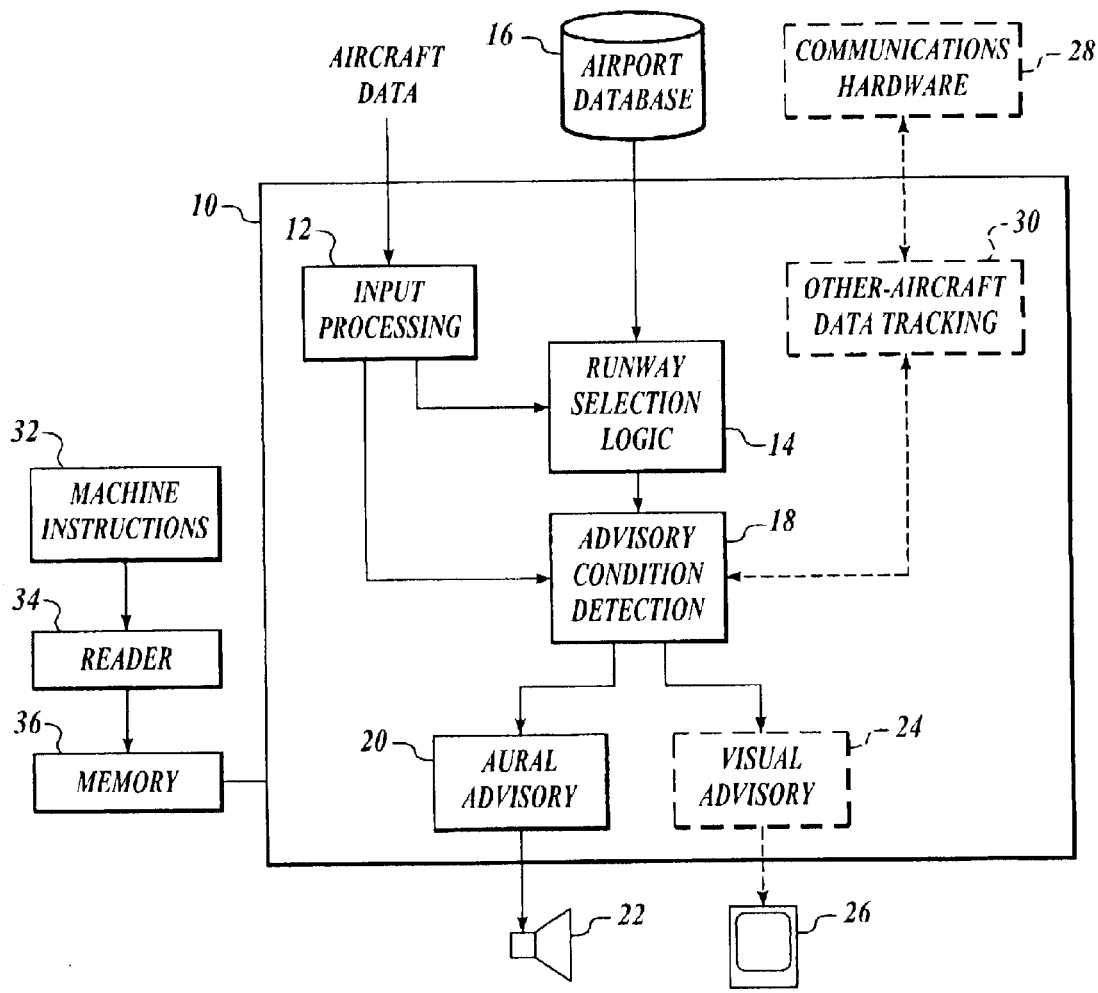
FIG. 1 illustrates by example and without limitation an airport situational awareness apparatus for locating an aircraft with respect to airport taxiways and runways and generating advisories for enhancing pilot situational awareness.

The present invention is described more fully hereinafter with reference to the accompanying drawings, in which preferred embodiments of the invention are shown. This invention is, however, embodied in many different equivalent forms and is not be construed as limited to the embodiments set forth herein; rather, these embodiments are provided so that this disclosure will be thorough and complete, and will fully convey the scope of the invention to those skilled in the art. Like numbers refer to like elements throughout.

The present invention is an apparatus, method and computer program product for generating and annunciating to the crew an aircraft advisory with respect to a position of the aircraft relative to airport taxiways and runways by selecting a runway and determining a position and orientation of the aircraft relative to the taxiways and runways, both on the ground during takeoff and landing, and providing pilot situational awareness of the airport taxiways and runways.

According to a Runway Selection or Identification System (Runway Selection) portion of the invention, the apparatus, method and computer program product determines the airport runway that the installation aircraft is most likely to encounter, whether taxiing, preparing for take-off, or approaching to land. According to one embodiment of the invention, the Runway Selection algorithm constructs an envelope around the runway as a function of the installation aircraft state parameters, including: ground speed, heading or track, and phase of flight.

According to a Runway Awareness and Advisory System (RAAS) portion of the invention, the apparatus, method and computer program product determines whether the installation aircraft is "on" a runway and when it will cross a runway in order to facilitate advising and enhance pilot situational awareness of airport runways, without generating either incorrect determinations or excessive nuisance warnings.

According to an Imminent Landing Situational Awareness (ILSA) portion of the invention, during landing the apparatus, method and computer program product determines that the landing has not been completed within specified conditions, and thereafter provides at a specified interval periodic altitude callouts to the nearest foot. Additionally, the ILSA system portion of the of the invention provides runway distance remaining callouts once additional conditions are satisfied.

According to a Aircraft Position Situational Awareness System (APSAS) portion of the invention, the apparatus, method and computer program product determines the position of the aircraft relative to the airport and reports the position of the installation aircraft on a graphical depiction of the airport and its approaches. The apparatus, method and computer program product optionally determines a motion vector of the installation aircraft and reports the information on the graphical depiction. Furthermore, the APSAS portion of the invention is operated to generate an RF broadcast of the own aircraft's position and motion vector to other aircraft in the airport vicinity and receive RF broadcasts of positions and motion vectors from other installation aircraft in the airport vicinity. Upon receipt of the other aircraft positions and motion vectors, the APSAS portion of the invention is operated to determine potential conflicts in the occupation of runways, and to annunciate the potential conflicts. Optionally, one or more of the other aircraft positions and motion vectors are depicted on the graphical depiction of the airport and environs. The other aircraft positions and motion vectors are depicted on the graphical depiction at least for aircraft having a position and motion vector that creates a potential conflict with the own aircraft. According to another aspect of the invention, the RF communications utilized by the APSAS portion of the invention overcome problems associated with the use of existing RF communication means, such as Mode S transponder, "ADS-B", or "UAT", for this function.

The present invention is an apparatus, method and computer program product for determining location of an aircraft with respect to airport taxiways and runways. The invention operates both on the ground during taxiing and take-off and in the air during landing. The invention selects a runway, and when the is aircraft landing, provides as aural or visual advisories, information about the aircraft's position relative to the selected runway. This landing relative position information is optionally transmitted to other aircraft at the facility, and relative position information about other aircraft at the facility is optionally transmitted to the landing installation aircraft.

When the aircraft is on the ground, the invention determines positional information relative to the taxiways and runways to determine whether the aircraft is "on" a runway and when it will cross a runway. The relative position information is used to facilitate advising and to enhance pilot situational awareness of airport runways, without generating either incorrect determinations or excessive nuisance warnings. This on-ground relative position information is optionally transmitted to other aircraft at the facility, including currently landing aircraft, and relative position information about other aircraft at the facility is optionally transmitted to the on-ground installation aircraft.

FIG. 1 illustrates by example and without limitation an airport situational awareness apparatus for locating an aircraft with respect to airport taxiways and runways and generating advisories for enhancing pilot situational awareness. The apparatus of FIG. 1 additionally transmits the aircraft's position with respect to airport taxiways and runways, along with a heading and ground speed vector, to other aircraft in the vicinity and receives the same information from those other aircraft.

The airport situational awareness apparatus of the invention includes, for example, a processor 10 hosting an Input Processing functional Block 12 that is coupled to periodically sample real-time electronic data signals representative of one or more aircraft state parameters of interest, such as latitude and longitude position information; radio, GPS, or barometric altitude; ground speed; track angle; gear setting; horizontal and vertical figures of merit; and one or more other aircraft state parameters as may be of interest. Such data is available in different formats, including ARINC Characteristic 429, ARINC Characteristic 575, analog, discrete, or an advanced digital format. The Input Processing Block 12 is structured to accept data in whatever format the installation aircraft provides. For example, the Input Processing Block 12 is coupled to an aircraft data bus or another suitable means for providing real-time electronic signal data source of instrument signals reporting aircraft state parameter information.

The navigation data may be obtained directly from the navigation system, which may include an inertial navigation system (INS), a satellite navigation receiver such as a global position system (GPS) receiver, VLF/OMEGA, Loran C, VOR/DME or DME/DME, or from a Flight Management System (FMS).

The Input Processing Block 12 then extracts and validates the aircraft state parameters of interest, and using this information computes derived parameter values such as "in air" and "geometric altitude" which is a blended combination of an instantaneous GPS altitude signal and the barometric altitude signal, as described by Johnson et al. in U.S. Pat. No. 6,216,064, entitled Method and Apparatus for Determining Altitude, issued on Apr. 10, 2001, which is owned by the assignee of the present application and the entirety of which is incorporated herein by reference.

The extracted and derived aircraft state parameter values of interest as discussed herein are generated as output signals to a Runway Selection Logic Processing functional Block 14 that is also coupled to receive runway information as discussed herein from a searchable Airport Database 16 of stored airport information that includes data on fixed obstacles (tower, buildings and hangars), taxiways and runways of interest, including: airport designator for identifying airport; width and length values; positions of taxiways; runway survey data, including runway center point, runway centerline and both runway endpoints; Runway Position Quality information providing a gross estimate in nautical miles of position uncertainty of runway and Quality Factor information providing fine estimate, for example in feet, of position uncertainty of runway; a runway accuracy factor used by an aircraft locating and advising (Runway Awareness and Advisory System—RAAS) portion of the airport situational awareness; runway elevation; runway true heading in degrees for the end of runway, and runway designator angle based on assigned designation; glideslope angle in degrees for an approach on either heading, i.e. from either end of the runway; runway designator; transition altitude in feet at the runway location; and runway quality information and terrain quality data within a selected area surrounding the runway, such as an area of about 15 miles, including highest and lowest elevations; and a survey accuracy factor. These and other information of interest are present as internal signals for operation of the airport situational awareness apparatus of the invention.

Internal signals operated on by the algorithms of the Input Processing Block 12 for different portions of the invention include: altitude ("GeoAlt," in the equations that follow); Ground Speed ("TAGndSpd"); In Air ("InAir"); Latitude ("TALatude"); Longitude ("TALngude"); and True Track ("TATruTrk").

The Runway Selection Logic Processing Block 14 may include features of U.S. Pat. No. 6,304,800, entitled Automated Runway Selection, issued to Yasuo Ishihara, et al. on Oct. 16, 2001, which is owned by the assignee of the present application and the entirety of which is incorporated herein by reference.

However, in relation to the description of the various embodiments of the present invention provided in detail below, it must be understood that aspects of the present invention can be used with any system that uses stored information concerning runways for runway selection. As this disclosure is for illustrative purposes only, the scope of the present invention should not be limited to the systems described below, as the concepts and designs described below may be implemented in any type of system that uses runway information for runway selection.

The Runway Selection Logic processing Block 14 also includes additional features and generates output signals as described herein.

The output signals generated by both the Input Processing Block 12 and the Runway Selection Logic Processing Block 14 are inputs to an Advisory Condition Detection Processing functional Block 18 that operates logic for detecting, as a function of these inputs, different conditions that result in the advisories of this invention. As a result of detecting one or more of the different conditions discussed herein, the Advisory Condition Detection Processing Block 18 generates output signals that stimulate an Aural Advising Processing functional Block 20 that includes processing for aural advisory generation and prioritization and outputs an aural advisory signal to an audio device 22 such as a cockpit speaker, headset or equivalent cockpit audio system.

The aircraft locating and advising portion of the airport situational awareness apparatus of the invention optionally includes a Visual Advising Processing functional Block 24 that generates video output signals to a cockpit display device 26 that result in display either or both of textual and pictographic information indicative of status and advisories.

Optional Communications Hardware 28 feeds data signals to an Other Aircraft Data Tracking Processing functional Block 30. If present, this combination of Communications Hardware 28 and Processing Block 30 transmits changes in the status of the installation aircraft to other aircraft in the vicinity; receives such transmissions from other aircraft and tracks the received data; and supplies the received data to the Advisory Condition Detection Processing Block 18 to support advisory generation.

Runway Selection Logic

According to one embodiment of the invention, the Runway Selection Logic Processing Block 14 operates the runway selection function described in U.S. Pat. No. 6,304,800 for determining a runway of interest. Accordingly, when operated in conformity with U.S. Pat. No. 6,304,800, the Runway Selection Logic Processing of block 14 operates a computer program product for predicting which one of at least two candidate runways on which an aircraft is most likely to land, such that data concerning the predicted runway may be used by ground proximity warning systems. The Runway Selection Logic Processing Block 14 receives data pertaining to an aircraft and from the Runway Database 16 receives data pertaining to at least two candidate runways in close proximity to the aircraft. Based on this data, the Runway Selection Logic Processing Block 14 determines a reference deviation angle between the aircraft and each candidate runway. This reference deviation angle may represent a bearing, track, or glideslope deviation angle between the aircraft and each candidate runway. The Runway Selection Logic Processing Block 14 further evaluates each of the reference deviation angles and predicts which of the candidate runways the aircraft is most likely to land. For example, according to one embodiment of the runway selection function described in U.S. Pat. No. 6,304,800, the Runway Selection Logic Processing Block 14 compares the reference deviation angle value associated with each candidate runway to the reference deviation angle associated with the other candidate runways. In another embodiment, the Runway Selection Logic Processing Block 14 may compare the reference angle deviation value associated with each candidate runway to an empirical likelihood model representing the likelihood that the aircraft is landing on the candidate runway based on the reference deviation angle. In this embodiment, the Runway Selection Logic Processing Block 14 evaluates the likelihood value generated for each candidate runway and predicts which runway the aircraft is most likely to land. In another embodiment of the runway selection function described in U.S. Pat. No. 6,304,800, the Runway Selection Logic Processing Block 14 may predict the runway based on a combination of likelihood values for each candidate runway, i.e., bearing, track, and glideslope likelihood.

According to another embodiment of the invention, the Runway Selection Logic Processing Block 14 operates one of the runway selection functions described herein.

For example, according to one embodiment of the Runway Selection Logic determination for any runway is a surrounding envelope that is augmented as a function of the installation aircraft's heading and ground speed. The augmentation function expands the runway envelope as a function of an aircraft direction vector having a magnitude that includes a fixed amount, an amount proportional to the width of the runway, and an amount proportional to the installation aircraft's ground speed in excess of a threshold. The direction of the augmentation expansion is opposite to the aircraft heading. The runway envelope is expanded by the augmentation function parallel to the runway such that the augmented runway envelope always contains at least the actual runway extents.

FIGS. 2 through 5 illustrate exemplary augmented RAAS runway envelopes computed by one alternative runway selection function for determining a runway of interest as operated by the Runway Selection Logic Processing Block 14. Accordingly, the runway selection function determines a runway envelope that at a minimum includes the runway width and length extents with the runway envelope being further augmented as a function of the aircraft heading and ground speed. The augmentation portion of the runway selection function is accordingly operated to adjust the runway envelope relative to an augmentation expansion having an expansion magnitude that is a combination of a fixed amount, an amount proportional to the width of the runway, and an amount proportional to the aircraft ground speed in excess of a ground speed threshold. The runway envelope is adjusted by the amount of the augmentation expansion in a direction opposite to the aircraft heading direction.

According to one embodiment of the invention, the augmented RAAS runway envelope is constructed by computing a Ground Speed Offset value that is an amount proportional to the aircraft ground speed. The Ground Speed Offset is computed according to the formula:

Ground Speed Offset=Period of Prediction (in seconds)*Ground Speed in excess of Ground Speed Threshold.

Augmented RAAS on Ground Runway Selection Envelope

While the aircraft is on the ground the augmented RAAS runway envelope is computed according to the formulae:

Augmentation Expansion Length=Width Offset+Fixed Offset+ Ground Speed Offset;

Augmentation Expansion Direction=180−Heading (in degrees);

Box Width Component=cosine (Aircraft Heading−Runway Heading)*Augmentation Expansion Length; and Box Length Component=sine (Aircraft Heading−Runway Heading)*Augmentation Expansion Length, where according to one exemplary embodiment of the invention, nominal input values are given by the following, but may be selected to have different values:

Width Offset=Width of Runway;

Fixed Offset=25 feet;

Ground Speed Threshold=10 knots; and

Period of Prediction=4 seconds.

The resulting runway envelope has a shape and a relation to the runway centerline, both of which are dependent upon the aircraft direction vector and aircraft ground speed in excess of a threshold ground speed, but are not necessarily dependent on the aircraft location relative to the runway.

Figure 2:
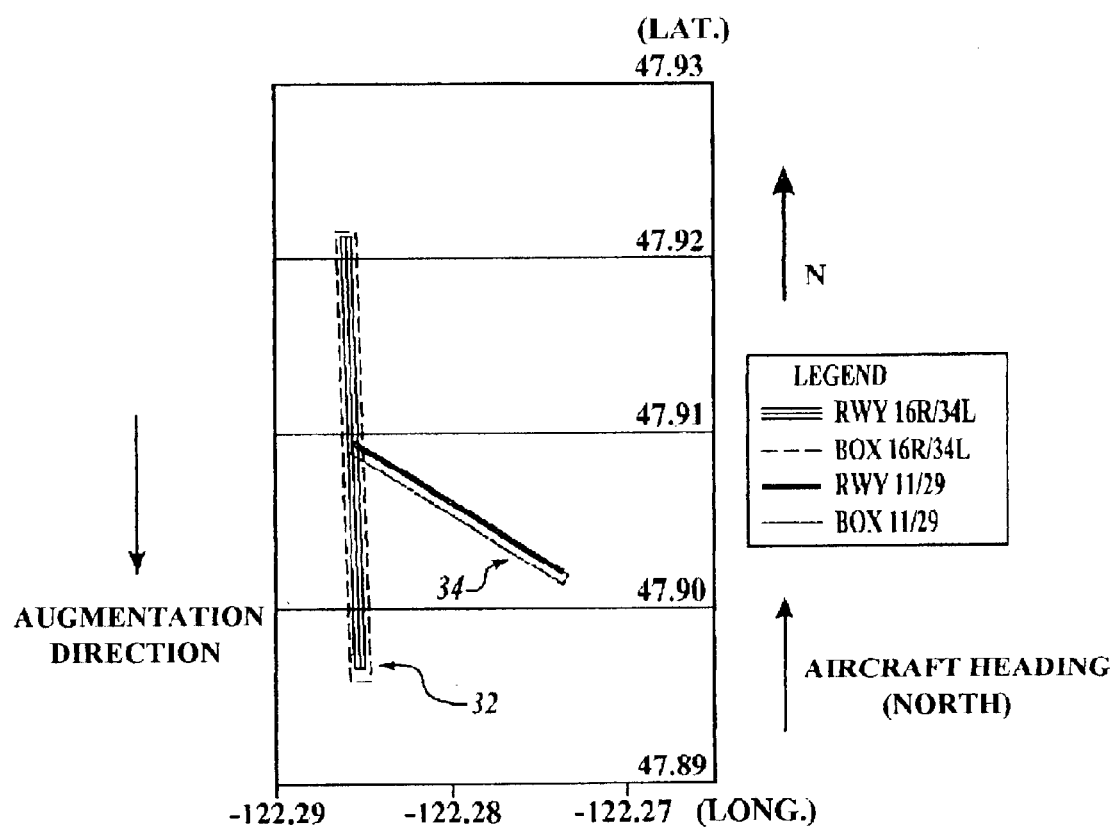

FIG. 2 illustrates exemplary augmented RAAS runway envelopes relative to four runways, RWY 16R/34L and RWY 11/29, for an aircraft on the ground and heading North at 8 knots. As illustrated, the length and width extents of the two runways RWY 16R/34L are represented by a pair of narrow, spaced apart lines with a centerline. The augmentation portion of the runway selection function provides an augmented portion 32 of the runways RWY 16R/34L that is illustrated as dashed lines bordering the runway on all sides. The Ground Speed Offset value relative to runways RWY 16R/34L is computed as described above using the aircraft speed of 8 knots. Augmentation Expansion Length is computed as the above combination of Width Offset, Fixed Offset, Ground Speed Offset.

The Augmentation Expansion Direction is aligned with the North-South aligned runways RWY 16R/34L, but is opposite in direction to the North heading of the aircraft.

The Box Width component of the augmented portion 32 is equal to the product of the cosine of the Aircraft Heading less the Runway Heading times the Augmentation Expansion Length.

The Box Length Component of the augmented portion 32 is equal to the product of the sine of the Aircraft Heading (in degrees) less the Runway Heading (in degrees) times the Augmentation Expansion Length.

The resulting runway envelope, represented here by the augmented portion 32, has a shape similar to but larger than the actual runway outline that is aligned to the runway centerline and is offset relative to runways RWY 16R/34L in the Augmentation Expansion Direction.

The length and width extents of the two crosswise runways RWY 11/29 are illustrated as a single thick solid line that includes its centerline. The augmentation portion of the runway selection function provides an augmented portion 34 of the runways RWY 11/29 that is illustrated as thin solid lines bordering the runways on the south side and both ends. The Ground Speed Offset value relative to runways RWY 11/29 is computed as described above using the aircraft speed of 8 knots. Augmentation Expansion Length is computed as the above combination of Width Offset, Fixed Offset, Ground Speed Offset; where Width Offset is nominally equal to the actual width of the runway but maybe selected differently.

The Augmentation Expansion Direction is again South opposite in direction to the North heading of the aircraft and therefore crosswise to north-west by south-east direction of runways RWY 11/29.

The Box Width component of the augmented portion 34 is equal to the product of the cosine of the Aircraft Heading less the Runway Heading times the Augmentation Expansion Length.

The Box Length Component of the augmented portion 34 is equal to the product of the sine of the Aircraft Heading less the Runway Heading times the Augmentation Expansion Length.

The resulting runway envelope, represented here by the augmented portion 34, has a shape that is similar to but larger than the actual runway outline and is offset relative to runways RWY 11/29 in the Augmentation Expansion Direction.

Figure 3:
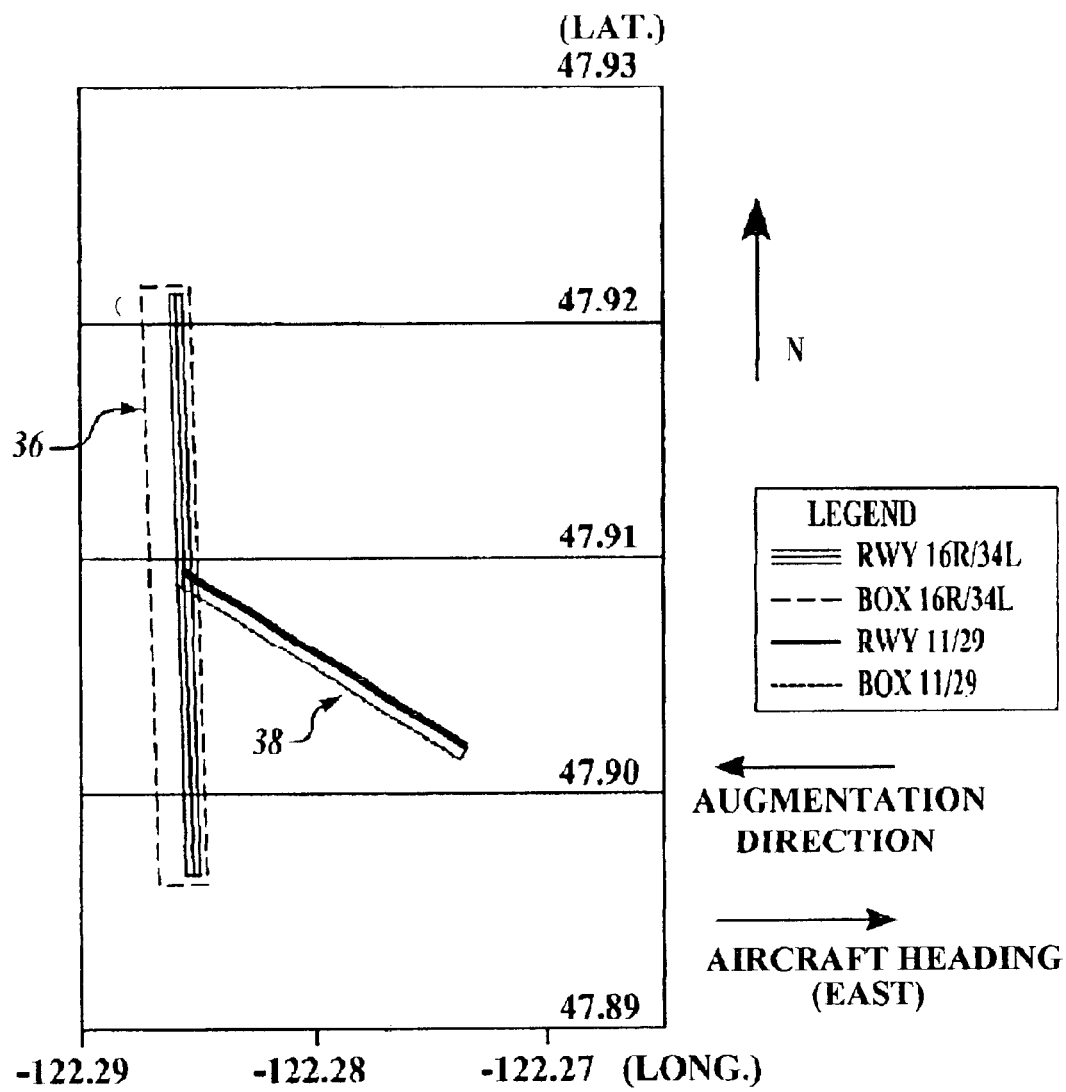

FIG. 3 illustrates exemplary augmented RAAS runway envelopes relative to the four runways shown in FIG. 2, RWY 16R/34L and RWY 11/29, for an aircraft on the ground but on an East heading at 8 knots. The augmentation portion of the runway selection function provides an augmented portion 36 of the runways RWY 16R/34L that is again illustrated as dashed lines bordering the runway on all sides. The Ground Speed Offset value relative to runways RWY 16R/34L is computed as described above again using the aircraft speed of 8 knots. Augmentation Expansion Length is again computed as the above combination of Width Offset, Fixed Offset, Ground Speed Offset. The Augmentation Expansion Direction is oriented across the North-South runways RWY 16R/34L opposite in direction to the East heading of the aircraft. The Box Width component of the augmented portion 36 is equal to the product of the cosine of the Aircraft Heading less the Runway Heading times the Augmentation Expansion Length. The Box Length Component of the augmented portion 36 is equal to the product of the sine of the Aircraft Heading less the Runway Heading times the Augmentation Expansion Length. The resulting runway envelope, represented here by the augmented portion 36, has a shape similar to but larger than the actual runway outline that is offset in the Augmentation Expansion Direction relative to the runway centerline but is substantially aligned relative to the North-South length extents of runways RWY 16R/34L.

The augmentation portion of the runway selection function provides an augmented portion 38 of the runways RWY 11/29 that is illustrated as thin solid lines bordering the runway on the eastward side and end. The Ground Speed Offset value relative to runways RWY 11/29 is computed as described above again using the aircraft speed of 8 knots. Augmentation Expansion Length is computed as the above combination of Width Offset, Fixed Offset, Ground Speed Offset. The Augmentation Expansion Direction is opposite in direction to the East heading of the aircraft and therefore crosswise to NW by SE runways RWY 11/29. The Box Width component of the augmented portion 38 is equal to the product of the cosine of the Aircraft Heading less the Runway Heading times the Augmentation Expansion Length. The Box Length Component of the augmented portion 38 is equal to the product of the sine of the Aircraft Heading less the Runway Heading times the Augmentation Expansion Length. The resulting runway envelope, represented here by the augmented portion 38, has a shape that is similar to but larger than the actual runway outline and is offset relative to runways RWY 11/29 in the Augmentation Expansion Direction.

Figure 4:
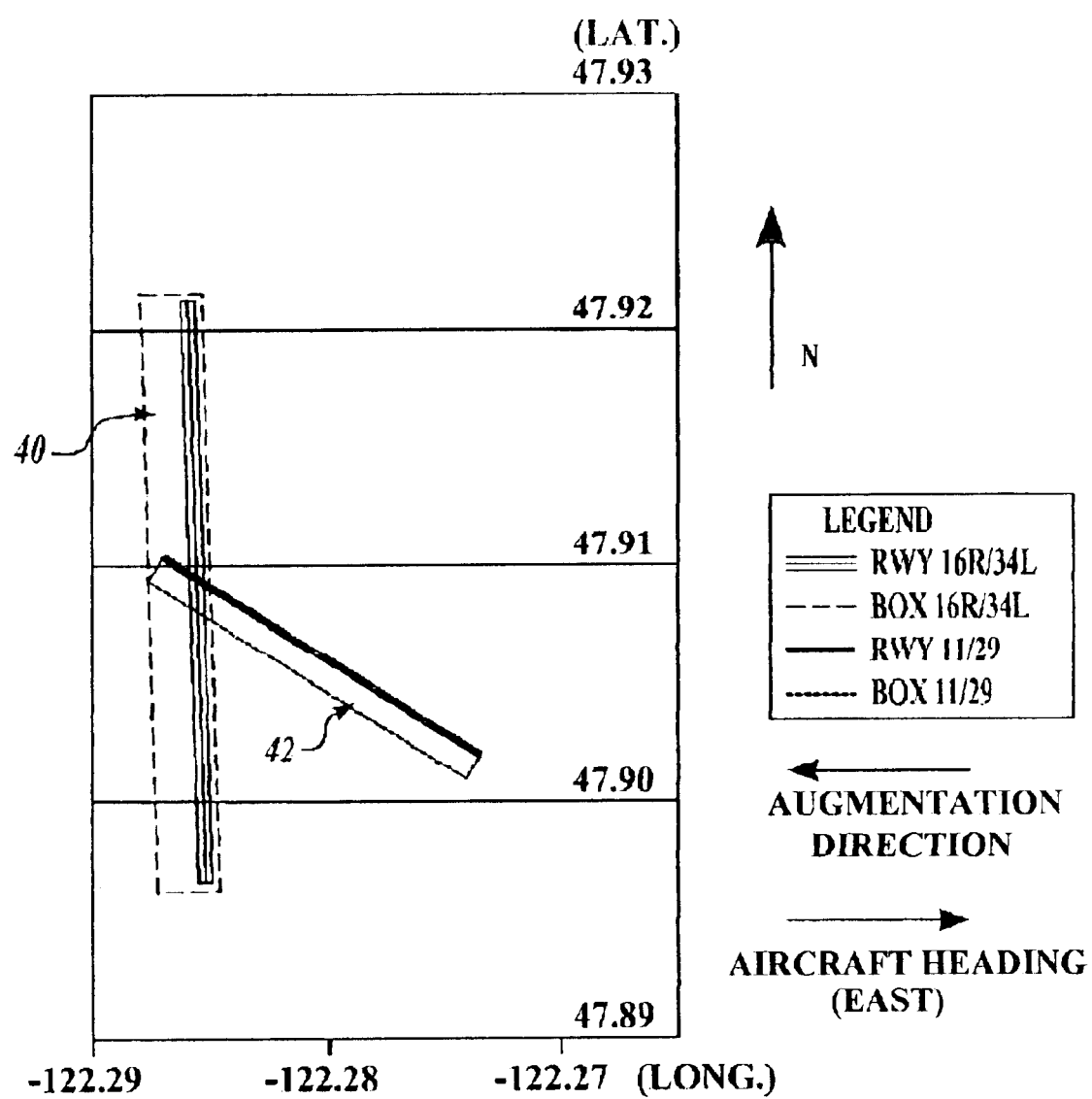

FIG. 4 also illustrates exemplary augmented RAAS runway envelopes relative to the four runways shown in FIG. 2, RWY 16R/34L and RWY 11/29, but for an aircraft on the ground heading East at 36 knots. The augmentation portion of the runway selection function provides an augmented portion 40 of the runways RWY 16R/34L that is again illustrated as dashed lines bordering the runway on all sides. The Ground Speed Offset value relative to runways RWY 16R/34L is computed as described above using the greater aircraft speed of 36 knots. Augmentation Expansion Length is again computed as the above combination of Width Offset, Fixed Offset, Ground Speed Offset. The Augmentation Expansion Length is longer than in the examples of FIGS. 2 and 3 because of the greater aircraft ground speed. The Augmentation Expansion Direction is again aligned across the North-South runways RWY 16R/34L in opposite direction to the East heading of the aircraft. The Box Width component of the augmented portion 40 is equal to the product of the cosine of the Aircraft Heading less the Runway Heading times the Augmentation Expansion Length. The Box Width component is larger than in the examples of FIGS. 2 and 3 because of the greater aircraft speed. The Box Length Component of the augmented portion 40 is equal to the product of the sine of the Aircraft Heading less the Runway Heading times the Augmentation Expansion Length. The resulting runway envelope, represented here by the augmented portion 40, has a shape similar to but larger than the actual runway outline that is offset in the West Augmentation Expansion Direction relative to the runway centerline, but is aligned relative to the North-South length extents of runways RWY 16R/34L.

The augmentation portion of the runway selection function provides an augmented portion 42 of the two runways RWY 11/29 that is illustrated as thin solid lines bordering the runway on the eastward side and end. The Ground Speed Offset value relative to runways RWY 11/29 is computed as described above using the greater aircraft speed of 36 knots. Augmentation Expansion Length is computed as the above combination of Width Offset, Fixed Offset, Ground Speed Offset. The Augmentation Expansion Direction is opposite in direction to the East heading of the aircraft and therefore crosswise to NW by SE direction of runways RWY 11/29.

The Box Width component of the augmented portion 42 is equal to the product of the cosine of the Aircraft Heading less the Runway Heading times the Augmentation Expansion Length. The Box Length Component of the augmented portion 42 is equal to the product of the sine of the Aircraft Heading less the Runway Heading times the Augmentation Expansion Length. The resulting runway envelope, represented here by the augmented portion 42, has a shape that is similar to but larger than the actual runway outline and is offset relative to runways RWY 11/29 in the West Augmentation Expansion Direction.

Figure 5:
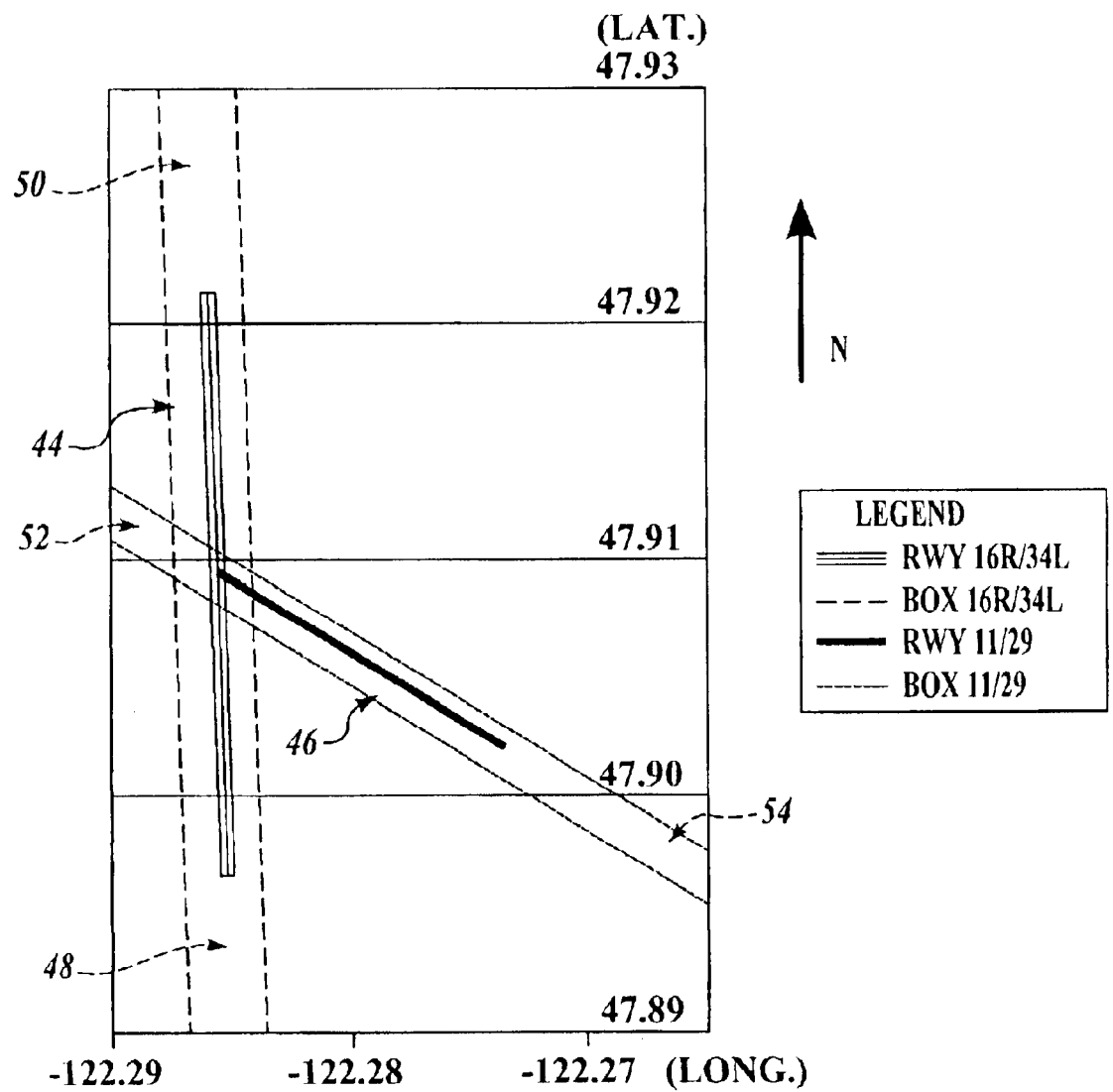

FIG. 5 illustrates the Runway Selection Logic of the invention as operated by the Runway Selection Logic Processing Block 14 for determining an exemplary augmented RAAS runway of interest for an airborne aircraft on approach. This embodiment of the Runway Selection Logic of the invention operates a novel algorithm for determining a runway envelope that at a minimum includes the runway width and length extents with the runway envelope being further augmented as a function of the aircraft heading and ground speed.

By example and without limitation, for an aircraft on approach, the Box Width is a function of a width multiplier times the width of the runway of interest. The Box Width is further augmented by the Box Width Component if the Box Width Component is a positive value, i.e. if including the Box Width Component increases the Box Width value. Box Width is thus given by:

Box Width=Kwidth*Width+Positive Box Width Component.

Similarly, the Box Length is a function of a length multiplier times the length of the runway of interest. The Box Length is further augmented by the Box Length Component if the Box Length Component is a positive value, i.e. if including the Box Length Component increases the Box Length value. Box Length is thus given by:

Box Length=Klength*Length+Positive Box Length Component.

According to one embodiment of the invention, the inputs to the Runway Selection Logic for an aircraft on approach are given by the following but may be selected to have different values:

Box Width Component=250 feet;
Box Length Component=1.8 nautical miles;
Kwidth=Lwidth=0.5; and
Width Offset, Fixed Offset, Ground Speed Threshold, and Period of Prediction have the values given herein.

The Box Length Component of the Runway Selection Logic of the invention thus generates, as part of the augmented RAAS runway annunciation envelope 44 respective volumes of airspace 48, 50, at the end of the runway for aircraft on approach. Similar volumes of airspace 52, 54 are generated by the augmented RAAS runway annunciation envelope 46.

Alternatively, the Box Length Component of the RAAS advisory annunciation envelope for an airborne aircraft on approach is computed as a function of the aircraft ground speed.

In FIG. 5 exemplary augmented RAAS runway envelopes are illustrated for an airborne aircraft on approach relative to the four runways, RWY 16R/34L and RWY 11/29 . The length and width extents of the two runways RWY 16R/34L are again illustrated as a pair of narrow, spaced apart lines with a centerline and beginning and ending extents. The augmentation portion of the runway selection function provides an augmented portion 44 of the runways RWY 16R/34L that is illustrated as dashed lines bordering the runway on the long sides only. The Box Width value relative to runways RWY 16R/34L is computed as described above. Box Length is computed as described above. The Box Width and Box Length values for the second two runways RWY 11/29 are similarly computed according to the algorithm and result in an augmented portion 46 that is illustrated as thin solid lines bordering the runway on the long sides only.

The resulting augmented runway envelopes, represented here by the augmented portions 44 and 46, have shapes that are similar to but wider and much longer than the actual runway outlines. The resulting runway envelopes are aligned with the four runways RWY 16R/34L and RWY 11/29 and extend beyond the ends of the runways in both directions.

Accordingly, when the aircraft is within the augmented RAAS runway envelope for a runway, the Runway Selection Logic selects the runway, determines the identification of the selected runway, and provides a signal representative of the runway identity.

Alternate Embodiment of Runway Selection Logic

Figure 6:
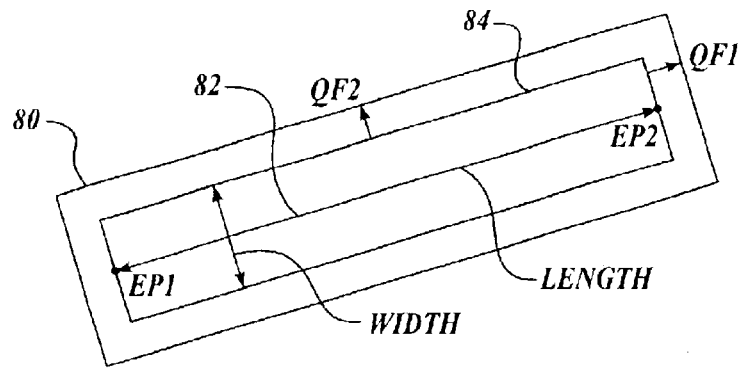
Figure 7:
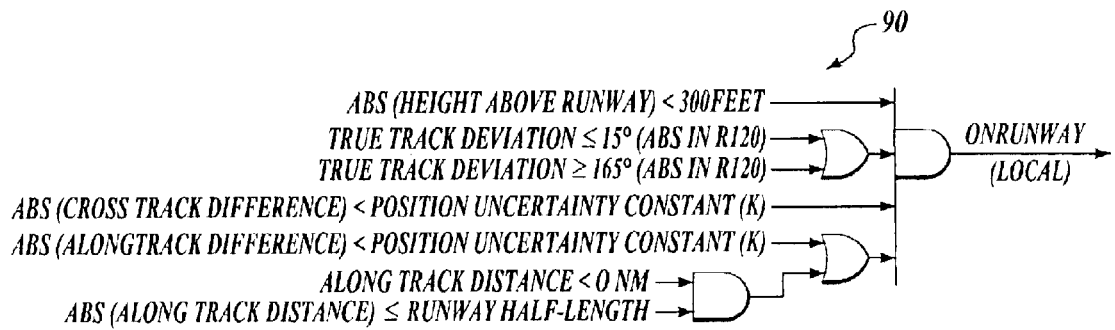

FIGS. 6 and 7 illustrate an alternative embodiment of the Runway Selection Logic that is provided for operation by the Runway Selection Logic Processing Block 14 for determining the runway of interest while the aircraft is on the ground. This alternative embodiment of the Runway Selection Logic includes a novel algorithm for scanning an existing array of 2, 4, 24 or more closest runways and selecting the one runway currently being approached or entered. The algorithm for scanning the array of closest runways and selecting the runway being approached or entered includes three components. One component of the algorithm is a function for computation of an envelope 80 called a "Bounding Box" that is illustrated in FIG. 6. The envelope or Bounding Box function uses two opposing runway endpoints, EP1 and EP2, of a runway for defining a line segment representing the length along the runway centerline 82. The runway width relative to this line segment, i.e. the runway centerline 82, is stored as runway information in a database of runway information, such as the Airport Database 16 shown in FIG. 1. A pair quality factors QF1 and QF2 defining the estimated position uncertainty of the endpoints EP1, EP2 are also stored as runway information in the database. The Bounding Box function uses these data for defining two rectangles, as shown in FIG. 6. An inner rectangle 84 is defined by the width and length of the runway, and the outer rectangle is the Bounding Box 80 as defined by the width and length of the runway enlarged by the quality factors QF1 and QF2, respectively. The quality factors QF1 and QF2 are optionally constants selected to be substantially identical.

A second component of the algorithm for scanning the array of closest runways and selecting the runway is a "Velocity Lead Term" computation function. Rather than trigger on aircraft current position, which can introduce undesirable system lags, the Velocity Lead Term is computed from Ground Speed and True Track data as position of the aircraft a short time into the future. For example, the Velocity Lead Term is computed as the position of the aircraft a few seconds, e.g. 2–3 seconds, into the future. The Velocity Lead Term is thus present to provide the flight crew sufficient time to respond to an indication that the runway has been selected.

A third component of the algorithm for scanning the array of closest runways and selecting the runway is a "Track Deviation" function that is used to reduce false or nuisance callouts while taxiing on a taxiway parallel to a runway. The Track Deviation function is operated by the processor 10 to select a parallel runway only under two conditions: if the aircraft current position is within the inner rectangle 84 shown in FIG. 6, i.e. the actual boundary of the runway; and if the angle between the aircraft track and the runway centerline is greater than a selected angle, commonly referred to as "right angle intersection." According to one embodiment of the invention, the selected right angle intersection is about 15 degrees. When the aircraft's ground speed falls below a threshold speed, such as 5 knots, the second right angle intersection term drops out and is neither computed nor used to control operation of the Track Deviation function.

FIG. 7 illustrates the Track Deviation function of the alternative on-ground Runway Selection Logic embodied in an exemplary logic diagram 90. According to the Track Deviation function as illustrated in FIG. 7, for each entry in the array of two or more closest runways, an "On Runway (local)" term is computed and output.

Accordingly, the "On Runway (local)" is TRUE for all runways that satisfy the following criteria: (1) the absolute value of the aircraft altitude or "Height Above Runway" is less than a selected value that indicates the aircraft is on the ground, such as 300 feet; (2) the aircraft current position is within the inner boundary of the runway 80, shown in FIG. 6, as determined by: (a) the absolute value of a Cross Track Distance relative to the inner boundary of the runway 80 is less than a pre-selected Position Uncertainty Constant (K); (b) if an Along Track Distance relative to the inner boundary of the runway 80 is less than a minimum value, such as 0 nautical miles (where the along-track distance is a signed number that positive on approach to the runway threshold and negative between the two endpoints of runway and having a maximum negative value at the midpoint of the runway so that a minimum value of 0 nautical miles indicates that the aircraft has crossed the threshold onto the runway), and the absolute value of the Along Track Distance is also less than half of the runway length; and (c) the Along Track Distance is less than the pre-selected Position Uncertainty Constant (K); and (3) the angle between the aircraft track and the runway centerline 82 is greater than the right angle intersection, as determined by the True Track Deviation, i.e. the selected right angle intersection, being between limits selected to indicate approximate parallelism with the runway 80 and the runway centerline 82, such as +/−15 degrees. For all entries where "On Runway (local)" is TRUE, this alternative on-ground Runway Selection Logic modifies its output as a function of the number of runway entries marked. Therefore, if no entries are marked, an "OnRwyTaxi" flag is FALSE, else TRUE. If rather exactly one entry is marked, that one entry is selected as the taxi runway (TRwy). However, if multiple entries are marked, the entry having the smallest track deviation in absolute magnitude is selected.

Data published by the Track Deviation function for the Taxi Runway includes: Along Track Distance to Taxi Runway, Cross Track Distance to Taxi, Taxi Runway True Track Deviation Runway, Taxi Airport Designator, Taxi Runway Designator as the angle and character (if any), Taxi Runway Half-Length, Taxi Runway, Taxi Runway Heading, and Taxi Runway Elevation from the Airport Database 16 with the units shown in feet.

Advisory Condition Detection and Annunciation

The Advisory Condition Detection Processing functional Block 18, shown in FIG. 1, operates logic for detecting different conditions that result in situational awareness advisories. The Advisory Condition Detection processing is further broken down into several different advising systems, including the Runway Awareness and Advisory System (RAAS) of the invention, the Aircraft Position Situational Awareness System (APSAS) of the invention, and the Imminent Landing Situational Awareness (ILSA) of the invention.

Runway Awareness and Advisory System (RAAS)

Approaching Runway Awareness Call-Out and Display

Landing and take-off from the incorrect runway currently account for approximately 15 percent of runway incursions. The apparatus, method and computer program product of the Runway Awareness and Advisory System (RAAS) portion of the invention addresses these problems by providing advisory annunciations as described herein to enhance pilot situational awareness. For landing and on-ground aircraft, the RAAS constructs advisory annunciation envelopes within which the situational awareness annunciations are announced are described herein and illustrated by example in FIGS. 2, 3, 4 and 5. The envelope 80 or Bounding Box illustrated by example in FIG. 6 is alternatively used in operation of the RAAS portion of the invention.

The RAAS generates only three situational awareness advisories in a normal course of events: a runway approach advisory is annunciated during approach, an approaching runway advisory is annunciated when the aircraft approaches a runway during taxiing on the ground, and an entering runway advisory is annunciated when the aircraft enters a runway on the ground. Other advisories may be annunciated under conditions described herein.

The apparatus, method and computer program product of the Runway Awareness and Advising System (RAAS) portion of the invention addresses this problem of landing on the incorrect runway by providing one or both of an aural and a visual annunciation of the runway that the aircraft is aligned with during the approach. This annunciation enhances pilot situational awareness much in the same way as current altitude call-outs on final approach.

The pilot interface for the RAAS approaching runway annunciation is nominally provided as an aural advisory call-out announced over the cockpit speaker system, such as the cockpit audio device 22 shown in FIG. 1. For example, one embodiment of a RAAS advisory annunciation for the approaching runway is given as, "Approaching runway XXX," or "Approaching XXX," where "XXX" is the runway designator. Either in addition to or as an alternative to the aural annunciation, a visual annunciation of the approaching runway advisory is provided on a display surface located within the flight deck, such as the cockpit display device 26 shown in FIG. 1. For example, the text "RWY XXX," or "Approaching RWY XXX" is provided on the cockpit display device 26.

The approaching runway annunciation is initiated only after the runway selection algorithm has established the most likely landing runway, determined that the aircraft has entered into the volume of airspace at the end of the runway established by the RAAS annunciation envelope, and determined that the aircraft is in the approach phase of flight.

Accordingly, the algorithms of the invention are operated as a function of determining: an aircraft state, i.e. current position and angular orientation; a current phase of flight; and a position of the most likely landing runway.

Current aircraft position is determined by the use of navigation aids, such as GPS, to obtain current latitude and longitude. Current track or heading serves as aircraft orientation. Phase of flight determination uses aircraft sensor inputs such as: gear positions which is optionally used to determine if the aircraft is in approach/landing configuration; height above destination airfield which can be determined using corrected barometric altitude and airfield elevation; and distance from destination airfield or the selected runway.

Alternatively, the invention uses the output of a ground proximity warning system. Such systems have been developed that evaluate the proximity of the aircraft to an airport and the flight altitude of the aircraft above the runway to determine if the aircraft is entering a landing procedure. For example, U.S. Pat. No. 5,839,080, entitled Terrain Awareness System, which is assigned to the assignee of the present application, the entire contents of which are incorporated herein by reference, describes a ground proximity warning system that provides several advantages as it does not require the monitoring of landing gears and flaps, but instead monitors the positional relationship between the airport and the aircraft. The ground proximity warning system monitors the altitude of the aircraft in relation to the runway closest to the aircraft. If the aircraft approaches the runway within a predetermined distance range and within a predetermined altitude range, the ground proximity warning system determines that the aircraft is entering a landing procedure. During the landing procedure, the ground proximity warning system creates a terrain floor surrounding the runway. As detailed in U.S. Pat. No. 5,839,080, the terrain floor represents minimum altitudes required by the aircraft at certain distances from the runway in order to safely approach the runway according to conventional landing procedures. Additionally, the terrain floor includes an area immediately adjacent to the runway where the alarms of the ground proximity warning system are not generated, such that the ground proximity warning system does not generate nuisance alarms during the final approach of the aircraft to the runway.

According to one embodiment of the invention, when the aircraft is in approach mode, a search algorithm establishes the position of the most likely landing runway as a function of the current aircraft position and the runway information retrieved from the Airport Database 16, shown in FIG. 1.

As described in FIG. 5, the RAAS annunciation envelope 44 establishes a volume of airspace relative to the end of the selected runway, for example, runway RWY 16R/34L. During approach and landing, the RAAS portion of the Runway Selection Logic establishes the runway selection by determining that the aircraft track or heading align with the runway centerline within a pre-selected angle for a sufficiently long period to establish that the aircraft is aligned with the runway. The alignment factor helps to establish that the aircraft is approaching the runway, rather than turning through an angle that momentarily coincides the runway. For example, if the aircraft track or heading align with the runway centerline within about ±15 degrees to about ±20 degrees for a selected period, the Runway Selection Logic establishes that the aircraft is approaching the runway for landing. After the runway selection algorithm has established the most likely landing runway, determined that the aircraft has entered into the volume of airspace at the end of the runway established by the RAAS annunciation envelope, and determined that the aircraft is in the approach phase of flight, an approaching runway annunciation is initiated. The RAAS advisory annunciation on approach is suppressed until all three conditions are satisfied. According to one embodiment of the invention, the RAAS continues to suppress the approach advisory annunciation until an additional minimum height above runway condition is satisfied. The minimum height above runway condition establishes a vertical limit above the runway above which the runway approach advisory annunciation is suppressed. This additional minimum height above runway condition goes to establishing that the aircraft is landing, rather than over-flying the runway.

The minimum height above runway condition is optionally included as a factor in the RAAS annunciation envelope generated according to FIGS. 2–5, whereby a vertical limit above the runway is established for the augmented volume of airspace surrounding the runway.

Figure 8:
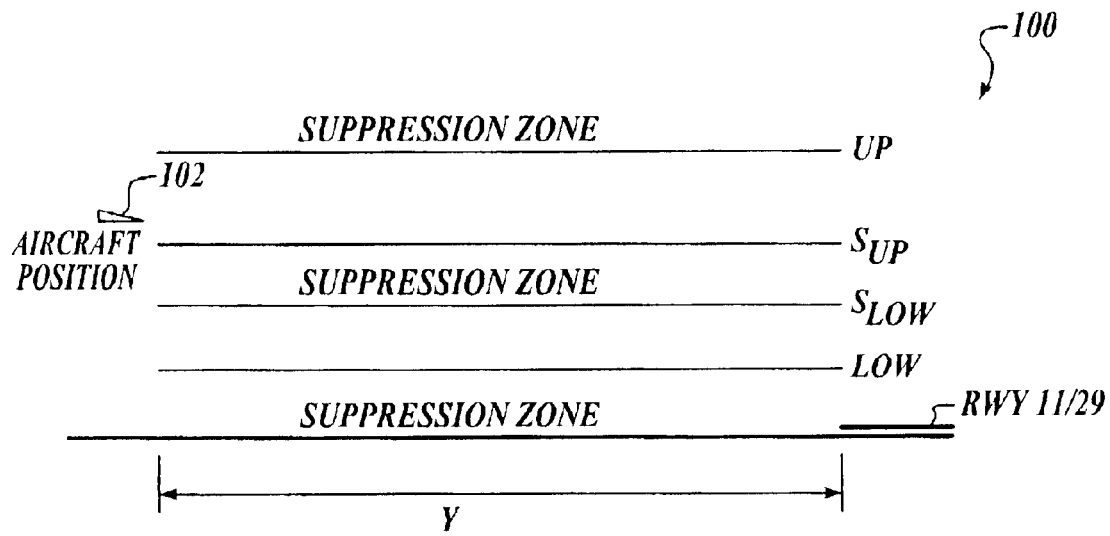
FIG. 8 illustrates selectable vertical and horizontal extents of the annunciation envelopes of the invention.

FIG. 8 illustrates by example and without limitation an optional selectable vertical height above runway limitation for the RAAS annunciation envelope to establish approach and landing of the aircraft. FIG. 8 illustrates selectable vertical and horizontal extents of the annunciation envelopes illustrated in FIGS. 2–5 and the alternative annunciation envelopes illustrated in FIGS. 9 and 10. After the runway selection algorithm has determined that the three conditions for initiating an approaching runway annunciation have been satisfied, the aircraft is in the approach phase of flight, has established the most likely landing runway, and has the runway approach annunciation envelope is generated at an appropriate point in the approach. The runway approach annunciation envelope is the volume of airspace generated relative to the end of the runway. The approaching runway annunciation is initiated upon entry of the aircraft into that envelope.

The RAAS advisory annunciation envelope for an airborne aircraft on approach is also suppressed until the aircraft is within the lengthwise extent Y of the augmented RAAS runway envelope as given by the Box Length Component, as shown in FIGS. 8 and discussed herein. Alternatively, the lengthwise extent Y of the augmented RAAS runway envelope for an airborne aircraft on approach is computed as a function of the aircraft ground speed.

The minimum height above runway condition is established according to vertical extents of the annunciation envelope 100 having an upper height, UP, above the selected runway such that the aircraft 102 is reasonably expected to land, rather than over-flying the airport. For example, the RAAS advisory annunciations are suppressed for an aircraft above a reasonable height above the runway, the upper height having by example a nominal value of about 700 to 800 feet above the selected runway elevation.

The vertical extents of the RAAS advisory annunciation envelope 100 are limited to lower height, LOW, relative to the selected runway such that the RAAS advisory call-outs do not interfere with other aural advisories during critical phases of landing. By example and without limitation, the RAAS advisory annunciations are suppressed for heights below 300 feet above the selected runway elevation so that the RAAS advisories do not interfere with normal Height Above Field call-outs.

For the same reasons, the RAAS advisory annunciation envelope 100 include a suppression zone having upper and lower vertical extents, $S_{UP}$ and $S_{LOW}$, above and below a normal intermediary Height Above Field call-out. For example, the upper and lower vertical extents, $S_{UP}$ and $S_{LOW}$, are selected to avoid interference with either a 400 foot Height Above Field call-out or a normal 500 foot Height Above Field call-out. By example and without limitation, the upper and lower vertical extents of the suppression zone are nominally selected as 550 feet and 450 feet, respectively, above the selected runway elevation so as to not interfere with a normal 500 foot Height Above Field call-out. Alternatively, the upper and lower vertical extents of the suppression zone are nominally selected as 450 feet and 350 feet, respectively, above the selected runway elevation so as to not interfere with a 400 foot Height Above Field call-out.

Optionally, one or more of the vertical extents of the RAAS advisory annunciation envelope 100 are disabled so as to not interfere with normal Height Above Field call-outs.

Figure 9:
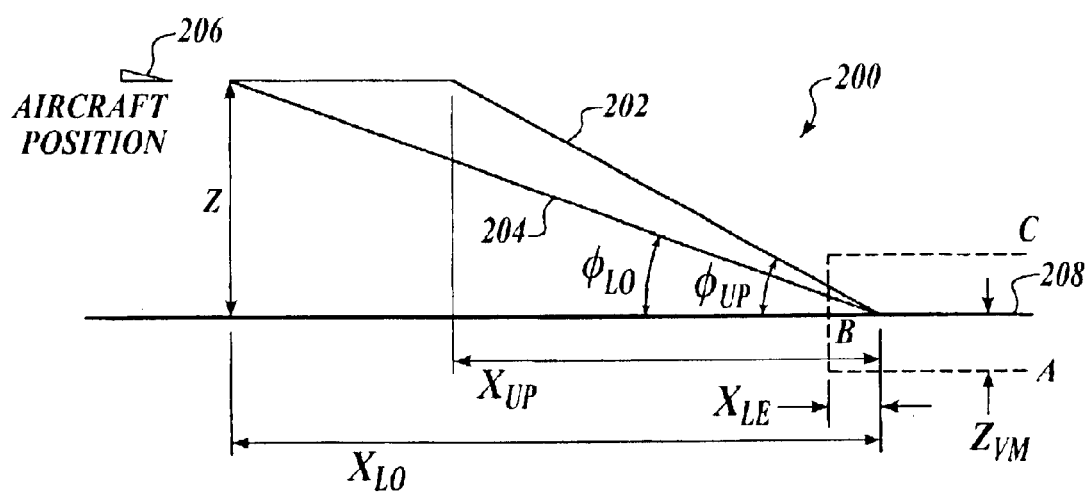
Figure 10:
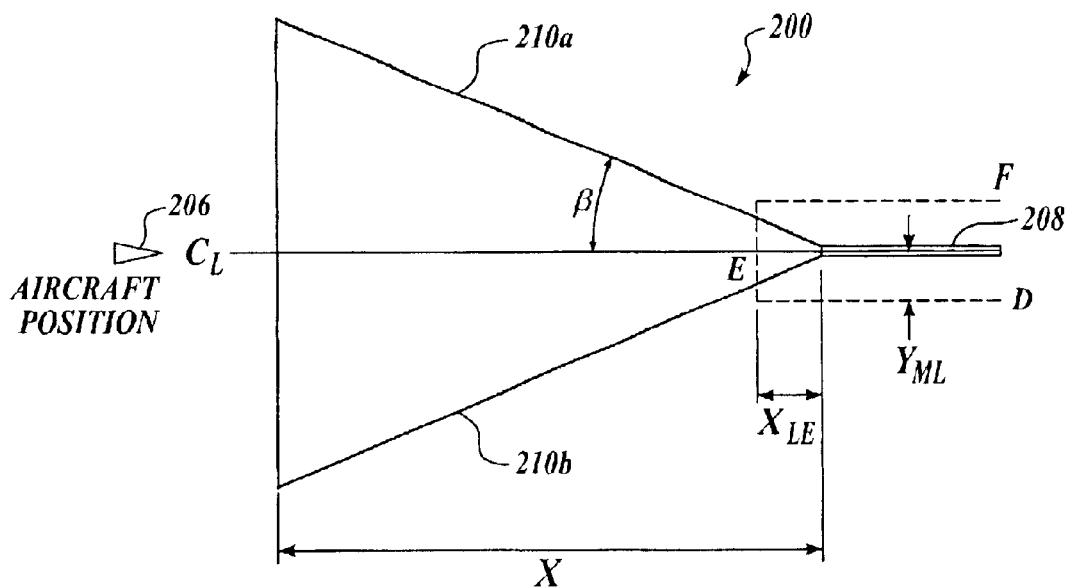

FIGS. 9 and 10 illustrate by example an alternative RAAS advisory annunciation envelope 200 for use during approach and landing of the aircraft. After the runway selection algorithm has determined that the aircraft is in the approach phase of flight and has established the most likely landing runway, the runway approach annunciation envelope 200 is generated at an appropriate point in the approach. The annunciation envelope 200 is a volume of airspace generated relative to the end of the runway. An approaching runway annunciation is initiated upon entry of the aircraft into that envelope.

FIG. 9 is a profile view of the alternative annunciation envelope 200 generated according to one embodiment of the invention. The annunciation envelope 200 includes upper and lower glide paths 202 and 204, respectively, defined by respective upper and lower angular limits, ($\Phi_{UP}$ and $\Phi_{LO}$, that ensure the aircraft 206 is within an operationally acceptable range of glides slopes. For example, a very shallow glide slope in the range of 1 degree can increase collision risk close to the ground. Nominal upper and lower glide path angular limits are about 15 degrees and 2 degrees, respectively. In cases of premature descent on approach the lower limit is also compatible with protection provided by known terrain awareness and warning systems, such as the Enhanced Ground Proximity Warning System® (EGPWS) available from Honeywell International, Incorporated of Redmond, Wash., that provide terrain avoidance protection for aircraft in the en-route and terminal environments.

Terrain avoidance protection always has priority over the runway annunciation advisories generated by the present invention. For example, near the runway, the runway approach annunciation envelope of the invention is modulated by a surface A-B-C that accounts for uncertainties, such as onboard instrument errors, errors associated runway survey data, and other uncertainties, by inhibiting annunciation if the aircraft is within the surface A-B-C. The inhibiting surface A-B-C is extended beyond the end of the most likely landing runway 208 along the approach path by a length extension, $X_{LE}$, having by example a nominal value of 0.5 miles. The inhibiting surface A-B-C is extended above and below the surface of runway 208 by a vertical margin, $Z_{VM}$, having by example a nominal value of about 100 feet. The annunciation envelope 200 is generated having a vertical limit, Z, that is selected having a elevation such as the "Height Above Field" or radio altitude. The vertical limit Z determines the vertical elevation below which the runway annunciation function is active. According to one embodiment of the invention, a nominal value for the vertical limit Z is by example five hundred feet Radio Altitude.

Horizontal limits, $X_{UP}$ and $X_{LO}$, for the respective upper and lower glide paths 202, 204 are calculated according to:

$X=Z/\mathrm{Tan}(\Phi)$, where: $\Phi$ is $\Phi_{UP}$ and $\Phi_{LO}$ for respective upper and lower glide paths 202, 204.

The glide path angular limits, horizontal limits, vertical limit, vertical margin and length extension describe the profile of the annunciation envelope.

FIG. 10 is a plan view of the alternative annunciation envelope 200 described in FIG. 9. The annunciation envelope is described in plan view by a horizontal limit X having by example a nominal value the same as the limit $X_{LO}$ selected for the lower glide path 204, as illustrated in FIG. 9, and an angle β subtended between an extended runway centerline, CL, and each edge, 210a and 210b, of envelope 200. According to one embodiment of the invention, the angle β is by example nominally about 15 degrees.

An inhibiting surface D-E-F provides modulation of the plan view envelope for reasons similar to those discussed for the surface A-B-C in connection with the profile view illustrated in FIG. 9. The inhibiting surface D-E-F is extended beyond the end of the most likely landing runway 208 along the approach path by the length extension, $X_{LE}$, shown in FIG. 9 and having by example a nominal value of 0.5 miles. The inhibiting surface D-E-F is extended on either side of the runway 208 by a horizontal margin, $Y_{ML}$, that is referenced to the runway centerline $C_L$. According to one embodiment of the invention, the horizontal margin $Y_{ML}$ is a constant having by example a nominal value of about 50 feet.

The height above runway suppression zones described in FIG. 8 for the RAAS advisory annunciation envelope are optionally applied to the annunciation envelope 200 described in FIGS. 9 and 10.

On-Ground Runway Awareness and Advisory System (RAAS)

In a normal course of events, the Runway Awareness and Advisory System (RAAS) of the invention are also are operated for determining an aircraft's position relative to taxiways and runways during taxiing on the ground. The RAAS thereby provide situational awareness advisories that facilitate advising and enhance pilot airport situational awareness during taxiing, without generating either incorrect determinations or excessive nuisance warnings. The RAAS algorithms determine when the aircraft will cross a runway and whether the aircraft is "on" the runway. Accordingly, in a normal course of events the RAAS provides both an on-ground approaching runway advisory and an on-ground entering runway advisory. The on-ground approaching runway advisory is annunciated when the aircraft approaches a runway during taxiing, and the on-ground entering runway advisory is annunciated when the aircraft enters a runway during taxiing.

For example, the RAAS determines that the aircraft will cross a runway and provides the on-ground runway approach advisory, "Approaching runway XXX," or "Approaching XXX," where "XXX" is the runway designator. In another example, the RAAS determines that the aircraft is "on" the runway and provides the on-ground runway entry advisory, "On runway XXX," or "On XXX," where "XXX" is again the runway designator. The RAAS portion of the invention thus provides only advisories, rather than warnings. The advisories are distinguished from warnings in that advisories provide only airport situational awareness information; they do not require any action on the part of the pilot or flight crew.

Imminent Taxiway Take-Off Annunciation

A number of runway incursions have arisen as a result of inadvertent take-off on a taxiway. In most of these instances poor pilot situational awareness was a major factor, especially in situations where the taxiway was parallel to the runway. Accordingly, the apparatus, method and computer program product of the invention is operated to provide the flight crew with one or both of an aural advisory call-out and a visual annunciation of an imminent taxiway take-off. This latter problem is addressed by the apparatus, method and computer program product of the invention for determining location of an aircraft with respect to airport taxiways and runways as a function of the runway selection logic described herein, and in particular to the RAAS advisory annunciation envelopes described herein.

As described herein, the RAAS advisory annunciation algorithms of the invention that provide this added pilot awareness of aircraft location with respect to taxiways and runways are operated as a function of aircraft latitude and longitude position information; aircraft groundspeed and aircraft heading; and pertinent runway data, such as position of runway ends and heading, as retrieved from the on-board searchable Airport Database 16 of taxiway and runway information.

The Annunciation Criteria may vary depending upon the specific implementation of the advising algorithm operated by the Advisory Condition Detection Processing Block 18 (shown in FIG. 1). However nominally, unless the aircraft is both on a runway and aligned with it, and groundspeed is greater than a threshold ground speed, by example nominally selected as about 40–60 knots, on-ground advisories are presented to the pilot, as described herein, as either or both of an aural and a visual advisory.

The pilot interface is nominally provided as an aural advisory call-out announced over the cockpit speaker system, such as the cockpit audio device 22 shown in FIG. 1. For example, one embodiment of an aural advisory call-out for a taxiway take-off annunciation is the advisory, "On taxiway, on taxiway." Either in addition to or as an alternative to the aural annunciation, a visual annunciation of the "On taxiway" advisory is provided on a display surface located within the flight deck, such as the cockpit display device 26 shown in FIG. 1.

Accurate survey data as regards airport taxiways are unavailable or prohibitively expensive. The Airport Database 16 therefore may lack complete and accurate taxiway survey data. For at least these reasons, the RAAS advisory annunciation algorithms optionally designates as taxiway all airport terrain that is not identified as runway in the Airport Database 16. Therefore, the RAAS advisory annunciation algorithms result in an on-taxiway advisory during operation of the aircraft that satisfies the groundspeed conditions, unless the Runway Selection algorithms determine the aircraft is both on a designated runway and aligned with it.

Runway Entry Broadcast/Advisory

Figure 11:
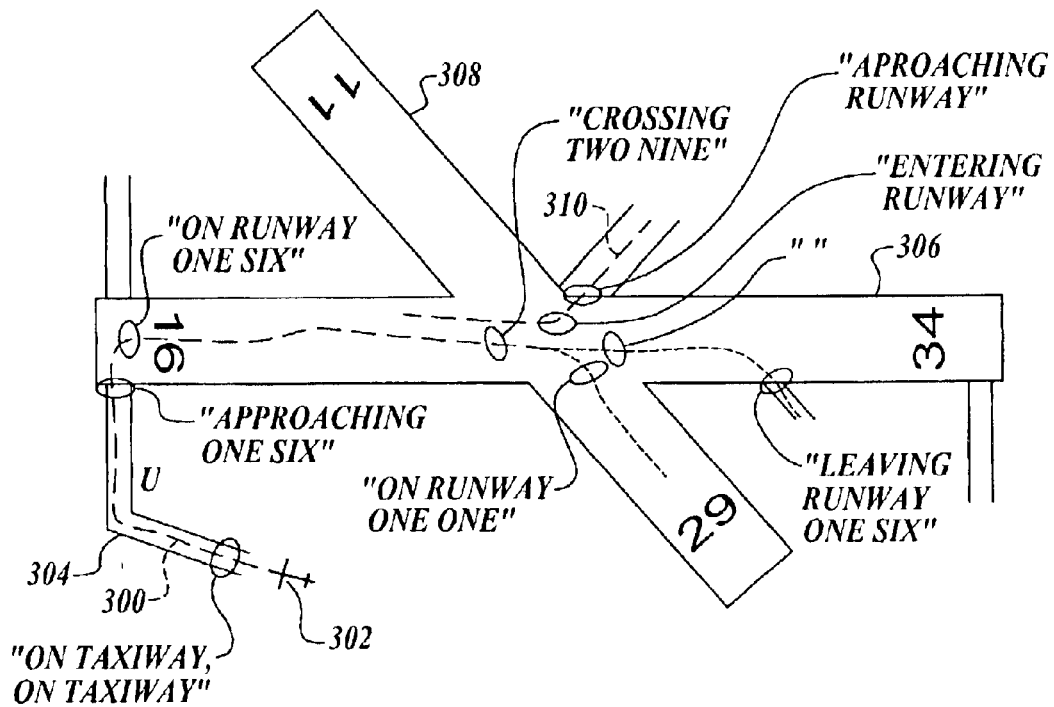
FIG. 11 illustrates the algorithms of the invention as operated by the airport situational awareness apparatus of the invention for providing advisory annunciation of runway identity upon approaching and entering runways on-ground.

FIG. 11 illustrates the algorithms of the RAAS portion of the invention as operated by the AuralNisual Advisory Condition Detection Processing function of the invention to provide the crew aural and optional visual annunciation of runway identity upon approaching and entering a runway on-ground. The illustration shown in FIG. 11 is a technology demonstrator that provides exemplary illustrations of trigger points for the functions of the RAAS portion of the invention for locating an aircraft with respect to airport taxiways and runways and generating advisories for enhancing pilot situational awareness.

By example and without limitation, FIG. 11 illustrates a path 300 of an on-ground aircraft 302 entering a taxiway 304 and traveling along it toward the runways RWY 16/34, designated here by reference numeral 306. As discussed herein, accurate survey data as regards airport taxiways may not be contained in the Airport Database 16 so that the RAAS advisory annunciation algorithms optionally designates as taxiway all airport terrain that is not otherwise identified as runway. Therefore, the RAAS advisory annunciation algorithms assume the aircraft to be on taxiway, unless the Runway Selection algorithms determine the aircraft is both on a designated runway and aligned with it.

According to the invention, the Input Processing functional Block 12 is receiving real-time electronic data signals representative of one or more aircraft state parameters of interest. The Input Processing functional Block 12 of the invention accordingly extracts and derives values of such aircraft state parameters of interest as latitude, longitude, radio or barometric altitude, ground speed, track angle, gear setting, horizontal and vertical figures of merit, and one or more other aircraft state parameters as may be of interest for generating the RAAS situational awareness advisories of the invention.

The extracted and derived parameter values are output to the Runway Selection Logic which is operated for retrieving relevant runway information from the database 16 of airport information and for determining that the aircraft is on the ground and taxiing in taxiway area 304 toward and eventually reaching the runways RWY 16/34. From the time the aircraft enters taxiway 304 until it reaches a runway the RAAS portion of the Advisory Condition Detection Processing function receives and monitors the pertinent data as described herein. If the data indicate an imminent taxiway take-off, the Advisory Condition Detection Processing function generates a warning to that effect, as described herein. In such instance, the RAAS portion of the Aural/Visual Advisory Processing function determines priority of the imminent taxiway take-off condition advisory, and if the advisory takes precedence, as described herein announces the advisory on over one or both the pilot interfaces described herein, i.e. the cockpit audio device 22 and the flight deck display surface 26. For example, one embodiment the advisory announcement of the invention for an imminent taxiway take-off annunciation is the advisory, "On taxiway, on taxiway."

Once the RAAS portion of the Runway Selection Logic function determines, as a function of updated real-time electronic data signals representative of one or more aircraft state parameters of interest and relevant runway information retrieved from the database of runway information, that the aircraft is leaving the taxiway for the runways RWY 16/34, and outputs an appropriate signal to the Advisory Condition Detection Processing function, the Advisory Condition Detection Processing function of the invention generates an advisory to that effect, as described herein. The Aural/Visual Advisory Processing function determines priority of the runway encounter advisory, and according to precedence, announces the advisory as described herein. According to one embodiment of the invention, the runway encounter advisory announcement is, "Approaching one six," or alternatively "Crossing one six."

The runway encounter advisory is triggered by entry of the aircraft into the augmented envelope surrounding the runway. Because the envelope is augmented as a function of aircraft ground speed, a rapidly moving aircraft receives the advisory earlier than a relatively slowly moving aircraft.

When the aircraft satisfies two conditions: that it encounters the runway centerline within pre-selected limits, and that the aircraft is aligned with the runway centerline within a pre-selected angle for a pre-selected minimum time period, the Advisory Condition Detection Processing function generates an advisory to that effect, as described herein. The Aural/Visual Advisory Processing function determines priority of the runway entry advisory, and according to precedence, announces the runway entry advisory as described herein. According to one embodiment of the invention, the runway entry advisory announcement is, 30 "On runway one six."

Under some circumstances the aircraft 302 is required to hold in position on the runway before being cleared for take-off. For example, the runway is in use by another aircraft. According to one embodiment of the invention, Extended Holding On Runway advisories are annunciated, whereby the runway entry advisory announcement is repeated after a selected period of silence. Thus, if the aircraft remains in position on the runway within preselected along-track distance limits, for example about 100 feet, for a selectable time period. The time period by which an extended hold is determined can be configured for 60, 90, 120, 180, 240, or 300 seconds By example the time period for determining an extended hold is set nominally at about 90 seconds after which time period the runway entry advisory announcement is repeated. For example, the runway entry advisory announcement is repeated twice as, "On runway, on runway," or alternatively, "On runway one six, on runway one six."

Additional runway entry advisories are optionally announced at selectable periods after the first reminder if the aircraft continues to remains in position on the runway. For example, the runway entry advisories are announced at periods nominally selected as 2 minutes and 5 minutes. Given this additional situational awareness information, the flight crew is made aware of the length of the hold and can query the tower as to the delay.

Extended Holding On Runway advisories are suppressed after an Aborted or Rejected Takeoff is detected. A Rejected Takeoff is detected when the aircraft ground speed falls by a selected amount below the maximum ground speed attained, for example, unless the ground speed falls by about 7 knots below the maximum ground speed attained.

The Extended Holding On Runway advisory is reset when the aircraft leaves the runway.

If the aircraft 302 continues along the runways RWY 16/34 and encounters crossing runways RWY 11/29, designated herein by reference numeral 308, the Runway Selection Logic function retrieves from the Airport Database 16 the identification of runways RWY 11/29 and outputs an appropriate signal to the Advisory Condition Detection Processing function which generates an advisory to that effect, as described herein. The Aural/Visual Advisory Processing function determines priority of the runway crossing advisory, and according to precedence, announces the advisory as described herein. According to one embodiment of the invention, the advisory announcement is, "Crossing runway two nine."

If the aircraft path 300 turns onto runways RWY 11/29 as determined by the Advisory Condition Detection Processing function, i.e., satisfying the conditions as described herein, an appropriate entry signal is generated and output to the Aural/Visual Advisory Processing function. In turn, the Aural/Visual Advisory Processing function determines precedence of the advisory, and if appropriate, announces the advisory as described herein. According to one embodiment of the invention, the advisory announcement is, "Entering runway one one," or "On runway one one."

If the aircraft path 300 alternatively remains on the runways RWY 16/34 as determined by the Advisory Condition Detection Processing function, the Advisory Condition Detection Processing function generates and outputs an appropriate signal to the Aural/Visual Advisory Processing function. According to one embodiment of the invention, in such instance the Aural/Visual Advisory Processing function makes no advisory announcement. Under such circumstance, the Aural/Visual Advisory Processing function need not determine priority of an advisory and precedence over other possible advisories and alerts. Alternatively, the Advisory Condition Detection Processing function generates a blank advisory and outputs an appropriate signal, and the Aural/Visual Advisory Processing function operates as with any other advisory condition.

If the aircraft path 300 eventually leaves the runways RWY 11/29 as determined by the Advisory Condition Detection Processing function, the Advisory Condition Detection Processing function, as described herein, it optionally generates and outputs an appropriate exit signal to the Aural/Visual Advisory Processing function. In turn, the Aural/Visual Advisory Processing function determines precedence of the advisory, and if appropriate, announces the advisory as described herein. According to one embodiment of the invention, the advisory announcement is, "Leaving runway one six."

The RAAS algorithms identify the runway approached or entered by aircraft position relative to the runway location retrieved from the Airport Database 16. However, if the aircraft instead taxies on a path 310 such that the aircraft approaches an intersection between two runways such that a level of uncertainty exists as to which of runways RWY 11/29 and runways RWY 16/34 is being approached, according to one embodiment of the invention, a generic RAAS advisory annunciation for the approaching runway is given as, "Approaching runways." Similarly, if the aircraft path 310 approaches runways RWY 16/34 at the midpoint such that a level of uncertainty exists as to whether runway RWY 16 or RWY 34 is being approached, the generic RAAS advisory annunciation for the approaching runway, "Approaching runways," is given.

Runway designation for entry at the midpoint is determined by the RAAS algorithms as a function of the direction or heading the aircraft establishes relative to the runway direction. If the aircraft heading becomes aligned with runway RWY 16 within the algorithm's angle and time period parameters, the runway entry advisory announcement is, is aircraft heading becomes aligned with runway RWY 34 within the algorithm's angle and time period parameters, the runway entry advisory announcement is, is given for runway RWY 34 as, "Entering runway three four," or "On runway three four."

The RAAS generates only the three situational awareness advisories described above in a normal course of events: the runway approach advisory during landing, and on-ground advisories: the approaching runway advisory, and entering runway advisory.

Wrong Runway Annunciation

Under special conditions other situational awareness advisories may be annunciated, such as a short or "wrong" runway take-off advisory. Numerous runway incursion have involved take-off from an incorrect or wrong runway. In several known cases, the runway was significantly shorter than the range of field lengths required for safe operation of the aircraft involved. The system described herein addresses this latter problem by providing the flight crew with an advisory call-out of a short or wrong runway take-off.

As described herein, the algorithms of the invention that provide this added pilot awareness of aircraft location with respect to taxiways and runways are operated as a function of current aircraft position according to GPS latitude and longitude, aircraft heading, and length of the current runway. In additional, the algorithm also utilizes a predetermined nominal take-off field length for the particular aircraft category.

Annunciation criteria may vary depending upon the specific implementation of the RAAS portion of the invention. However nominally, the advising algorithm operated by the Advisory Condition Detection Processing Block 18 (shown in FIG. 1) initially establishes whether the aircraft is on and lined-up with a runway, as discussed herein. The runway distance or length remaining is computed as a function of the current position of the aircraft on the runway and knowledge of runway length. Runway length remaining is compared with the nominal take-off field length required for take-off. If runway length remaining is less than the nominal take-off field length required, a short, i.e. wrong, runway annunciation is provided to the pilot as an aural advisory call-out announced over the cockpit speaker system, such as the cockpit audio device 22 shown in FIG. 1. For example, one embodiment of an aural advisory call-out for a taxiway take-off annunciation is the advisory, "Short Runway".

Either in addition to or as an alternative to the aural annunciation, a visual annunciation of the "Short Runway" advisory is provided on a display surface located within the flight deck, such as the cockpit display device 26 shown in FIG. 1.

According to the one embodiment, the apparatus, method and computer program product of the invention include means for generating a RAAS available runway advisory representative of the runway length available for landing. Accordingly, the apparatus, method and computer-readable program code of the invention access the database 16 of airport information and retrieve the stored parameters of the selected runway; determine the position of the installation aircraft relative to one or both of the runway endpoints; compute the remaining runway distance available for landing; and generate the available runway advisory accordingly. Optionally, the RAAS available runway advisory is generated as a function of the aircraft category, whereby the runway length available for landing is compared with a nominal runway landing length specified for the installation aircraft category. The RAAS available runway advisory is generated if the nominal runway landing length specified for the installation aircraft category exceeds the runway length available for landing. According to one embodiment of the invention, the RAAS available runway advisory generation is suppressed, unless the nominal runway landing length specified for the installation aircraft category exceeds the runway length available for landing.

According to one embodiment, the apparatus, method and computer program product of the invention include means for generating and annunciating advisories that report a length of runway remaining before the end of the runway in selectable increments, by example and without limitation increments of 1000 feet or 300 meters, after the installation aircraft passes a midpoint in the length of the selected runway. The invention also includes means for generating advisories that report a plurality of remaining runway lengths before the end of the runway, such as remaining runway lengths of 500 feet and 100 feet.

Imminent Landing Situational Awareness (ILSA)

Imminent Landing Situational Awareness (ILSA) is another airport situational awareness program that is optionally operated in combination with the RAAS during landing phase of flight. During the last sequence of the landing, there is a need for increased situational awareness of the aircraft altitude and the remaining runway distance.

According to the ILSA system portion of the present invention, the apparatus, method and computer program product of the invention are operated for enhancing the pilot's awareness of the aircraft position and altitude during operations in airspace near the airport and on the runway. Accordingly, the ILSA system provides a flare altitude monitor that determines that the landing has not been completed within specified conditions, and thereafter provides at a specified interval periodic altitude callouts to the nearest foot. Additionally, the ILSA system portion of the of the invention provides runway distance remaining callouts once additional conditions are satisfied.

The ILSA system portion of the of the invention utilizes the aircraft's radio altimeter to provide flare callouts when one or more "gates" and their respective timeouts are satisfied. According to one embodiment of the invention, a first gate is triggered when the aircraft descends below a first altitude $H_{HIGH}$ with a first timeout period $T_{HIGH}$. For example, the first altitude may be 20 feet with a timeout of 10 seconds. A second gate is triggered when the aircraft descends below a second altitude $H_{LOW}$ that is lower than the first altitude $H_{HIGH}$ with a second timeout period $T_{LOW}$. For example, the second lower altitude may be 10 feet with a second timeout of 6 seconds. The flare callouts are repeated at regular intervals, for example every 4 seconds. Flare callouts are locked-out under circumstances that indicate one of: the aircraft slowing to below a minimum threshold speed; the aircraft altitude rising above a minimum threshold altitude $H_{RESET}$ that indicates a go-around; or the aircraft altitude falls below a maximum threshold altitude that indicates it is on the ground. For example, if the aircraft ground speed falls below a minimum threshold speed of about 60 knots, the flare callouts are locked out. If the altitude (AGL) rises above a minimum threshold altitude of about 100 feet, a go-around is indicated and the flare callouts are locked out. If the altitude is at or below a maximum threshold altitude that indicates it is on the ground, the flare callouts are locked out. The maximum threshold altitude that must be satisfied may be set above ground level to allow for radio altitude errors. For example, the maximum threshold altitude may be set at about 1 foot above ground level.

The remaining runway distance aspect of the ILSA system portion of the of the invention utilizes the GPS position information, runway information retrieved from the Airport Database 16, and optionally, heading information retrieved from a suitable source of aircraft information, to compute the position of the aircraft relative to the end of the runway. According to the remaining runway distance aspect of the ILSA system, when the aircraft position is determined to be past the center point of the runway and a callout point is reached, an appropriate callout is annunciated. The callout points are selected to advise the flight crew of the decreasing length of runway remaining. By example and without limitation, the callout points are selected to be at 3000, 2000, 1000, and 500 feet of remaining runway length. The runway remaining callouts are locked out under specified conditions such that nuisance warnings are reduced or eliminated. Accordingly, the callouts are locked out after a first annunciation, or if the aircraft ground speed falls below a selected safe threshold, by example nominally selected as about 40 to 60 knots.

Flare Altitude Monitor Advisory

The ILSA system flare altitude monitor provides an aural indication to the flight crew during the flare just before landing to help alleviate potential situational awareness errors such as: landing long, landing short, bouncing, landing hard, and go-around. The ILSA system flare altitude monitor aurally informs the flight crew of the aircraft's current altitude after the trigger condition has been satisfied. The monitor repeats the aural altitude advisories at regular intervals until the aircraft has either landed or a go-around occurs.

Figure 12:
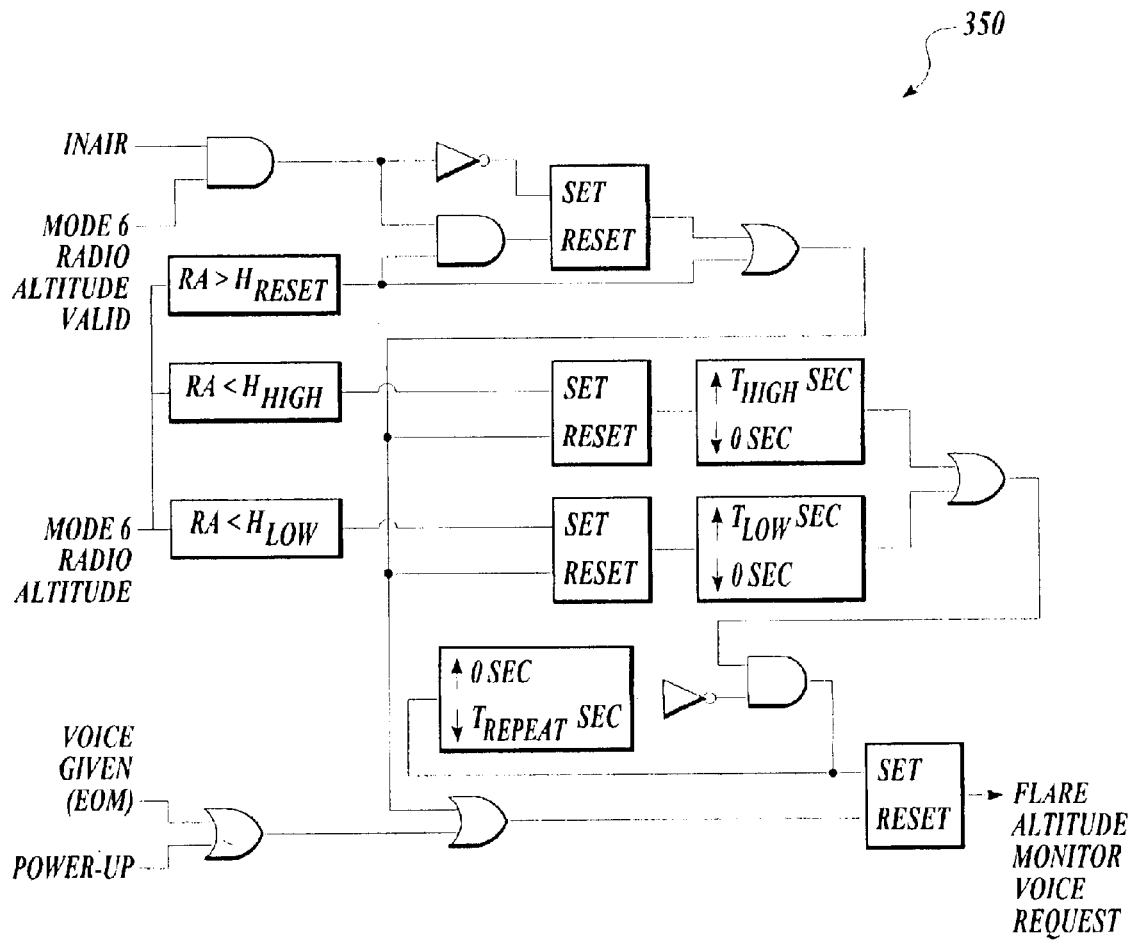
FIG. 12 is a block diagram that illustrates one embodiment of a flare altitude monitor of the present invention.

FIG. 12 is a block diagram that illustrates one embodiment of the ILSA system flare altitude monitor of the present invention. FIG. 12 illustrates the warning algorithms of the ILSA system flare altitude monitor 350, including the gates $H_{HIGH}$ and $H_{LOW}$ and their respective timeouts $T_{HIGH}$ and $T_{LOW}$. The altitude signal is provided, by example and without limitation, as a radio altitude signal provided as an output of the well-known Mode 6 portion of a Ground Proximity Warning System (GPWS) or Enhanced Ground Proximity Warning System (EGPWS). The flare callout lock-outs are provided as described above by: comparing the aircraft altitude rate to a threshold altitude rate $H_{RESET}$ that indicates a go-around. For example, the ILSA uses a simple compare of altitude rate to a reasonable threshold altitude rate, for example 300 fpm, which is ANDed into the reset logic to suppress flare callouts during a go-around. The flare callout lock-outs are also provided by comparing the aircraft altitude to a maximum threshold altitude that indicates it is on the ground (input signal InAir shown as FALSE).

One of the callout lock-outs for the remaining runway distance aspect of the ILSA system is provided as described above by: a determination that the annunciation was already given once, shown as a VOICE GIVEN signal that is output at the end of the message annunciation (EOM) so that messages do not overlap. The remaining runway distance callouts are optionally locked-out if the aircraft ground speed falls below a selected safe threshold when compared to a threshold speed.

The warning algorithms are further defined by a quantity of additional conditions that are processed at a minimum sampling rate given, by example and without limitation, as ten times per second. A Flare Altitude Monitor Voice Advisory is TRUE if the following conditions exist: a Flare Altitude Monitor High Enable is TRUE, or a Flare Altitude Monitor Low Enable is TRUE and a Flare Altitude Monitor Repeat is FALSE. A Flare Altitude Monitor Voice Request is set TRUE when the Flare Altitude Monitor Voice Advisory transitions from FALSE to TRUE. The Flare Altitude Monitor Voice Request is set FALSE when any of the following conditions are satisfied: a Flare Altitude Monitor Voice has been given (end of message); Power-Up is TRUE; and a Flare Altitude Monitor Reset is TRUE. The Flare Altitude Monitor Repeat is set TRUE when Flare Altitude Monitor Voice Advisory transitions from FALSE to TRUE. The Flare Altitude Monitor Repeat is set FALSE when the Flare Altitude Monitor Voice Advisory has been FALSE for a selected period of time, having a default value nominally selected as 5 seconds. The Flare Altitude Monitor Voice is set continuously re-computed and updated from the Mode 6 Radio Altitude while the Flare Altitude Monitor Voice Request is active. Flare Altitude Monitor Reset Latch is set TRUE under conditions where either the Mode 6 Radio Altitude Valid is FALSE, or the InAir Valid is FALSE. Flare Altitude Monitor Reset Latch is set FALSE if all of the following conditions exist: the Mode 6 Radio Altitude Valid is TRUE; the Mode 6 Radio Altitude is greater than a selected maximum height above the runway, the maximum height having a default value nominally selected as 100 feet; and the InAir Valid is TRUE. The Flare Altitude Monitor Reset is TRUE if either the Flare Altitude Monitor Reset Latch is TRUE, or the Mode 6 Radio Altitude is greater than the default maximum height. A Flare Altitude Monitor High Trigger is set TRUE if the Mode 6 Radio Altitude is less than a selected minimum height above the runway, the minimum height having a default value nominally selected as 20 feet. The Flare Altitude Monitor High Trigger is set FALSE if the Flare Altitude Monitor Reset is TRUE. The Flare Altitude Monitor High Enable is set TRUE if the Flare Altitude Monitor High Trigger is TRUE for more than a selected minimum time period having a default value nominally selected as 15 seconds. A Flare Altitude Monitor Low Trigger is set TRUE if the Mode 6 Radio Altitude is less than a selected minimum height above the runway, the minimum height having a default value nominally selected as 10 feet. The Flare Altitude Monitor Low Trigger is set FALSE if the Flare Altitude Monitor Reset is TRUE. A Flare Altitude Monitor Low Enable is set TRUE if the Flare Altitude Monitor Low Trigger is TRUE for more than a selected maximum period of time, having a default value nominally selected as 5 seconds.

Aircraft Position Situational Awareness System (APSAS)

According to one embodiment of the invention, data is optionally output to and received from other aircraft. The function of the invention for determining location of an aircraft with respect to airport taxiways and runways provides the crew with either or both of aural and visual annunciation of information indicating as appropriate that: a runway being approached or entered is occupied by another vehicle or other airport equipment; a runway being approached or entered is being vacated by other vehicle; and another vehicle is approaching or entering a runway currently occupied by the installation aircraft.

The Aircraft Position Situational Awareness System (APSAS) portion of the invention is operated by the Processing Block 30, shown in FIG. 1, to determine the position of the aircraft relative to the airport and reports the position of the installation aircraft on a graphical depiction of the airport and its approaches that is displayed on a display surface located within the flight deck, such as the cockpit display device 26 shown in FIG. 1.

Under conditions whereby the installation aircraft may be affected by on-ground and other traffic in the airport vicinity, the APSAS of the invention is operated to improve situational awareness of the installation aircraft relative to the airport and its environs. Accordingly, the APSAS of the invention is operated under circumstances where initial conditions indicate that the aircraft is on the ground at the airport, or landing or taking-off from the airport.

The APSAS apparatus, method and computer program product of the invention initially and periodically retrieves up-dated extracted and derived aircraft state parameter values of interest, as described herein, including aircraft altitude, GPS position, heading, ground speed information, and other information of interest useful for determining a current phase of flight. If as a function of the aircraft state parameter values the aircraft is determined to satisfy conditions that indicate that it is either on the ground at the airport, or landing or taking-off from the airport, the APSAS is made operational for reporting a position and velocity vector of the installation aircraft relative to an airport of interest, i.e. the local airport.

The APSAS apparatus, method and computer program product of the invention queries the Airport Database 16 for survey information describing the taxiway, runway and fixed obstacle layout of the airport of interest, i.e. the local airport, and retrieve the survey information if available. Using this survey information the APSAS develops a graphical depiction of the airport of interest and its approaches and outputs a video signal representative of the graphical depiction to the cockpit display device 26. Alternatively, the graphical depiction of the airport is stored in the Airport Database 16 and retrieved therefrom. The APSAS periodically retrieves up-dated extracted and derived aircraft state parameter values, as described herein, including aircraft altitude, GPS position, heading, ground speed and ground speed information, and flap and gear position information or other information relative to the current phase of flight. The APSAS periodically outputs the up-dated extracted and derived aircraft state parameter values to the cockpit display device 26 as video signals representative of an aircraft position and heading vector relative to the graphical depiction of the airport. The APSAS plots the up-dated position and heading vector over the graphical depiction of the airport. The up-to-date aircraft position and velocity vector information relative to the airport and its environs are thereby available at a glance for enhancing the airport situational awareness of the pilot and flight crew.

According to one embodiment of the invention, the APSAS periodically broadcasts the up-to-date aircraft position and velocity vector information and changes in the status of the installation aircraft to other aircraft in the vicinity by RF broadcast via on-board communications hardware 28, and periodically receives such broadcasts from other installation aircraft in the vicinity using a short range, low power local band that limits the range of the broadcast to the airport and its immediate environs. Ground-based repeaters are optionally employed in area of severe signal attenuation such as areas shielded by terrain or by fixed obstacles such as hangers. This broadcast of aircraft position and velocity vector information is conceptually similar to existing RF communication functions such as Mode S transponder, or the evolving Automatic Dependent Surveillance (ADS, or "ADS-B") concepts including "UAT," but in practice it differs significantly in that the APSAS broadcast includes specialized RF characteristics and is designed to solve a different problem. Existing ADS data could be used to augment some parts of the APSAS broadcast of the current invention, but is insufficient to solve the problem at least because these other existing RF communication systems are typically disabled on the ground to reduce or limit frequency congestion which precludes relying on the data for on-ground runway conflict detection. These other existing RF communication systems (with the exclusion of UAT) are relatively expensive, which in practice excludes their application to small aircraft, trucks, and fixed obstacles, which are many times at the root of real-world accidents that the present invention addresses. These other existing RF communication systems fail to incorporate at least some of the flag bits, e.g., OnRwy, Crossing, and M/T flag shown in FIG. 13, used to enable the APSAS advisories. These other existing RF communication systems by design utilize a relatively high-power broadcast. Even if all these identified problems were addressed, the resulting larger RF communication system for practicing the APSAS invention would fail at busy airports because of frequency congestion. Reducing the transmit power would make them useless to their existing purposes. These other existing RF communication systems differ from the APSAS RF communications system by necessity because they solve different problems.

The APSAS broadcast information is optionally limited to GPS position information with the velocity vectors of other aircraft being computed by the APSAS algorithm as a function of changes in the received position information over time. The Other Aircraft Data Tracking Processing functional Block 30 of the APSAS tracks the received data and supplies it to the Advisory Condition Detection Processing Block 18 for plotting on the display device 26 over the graphical depiction of the airport, and to support advisory generation.

The Advisory Condition Detection Processing Block 18 of the APSAS apparatus, method and computer program product receives either the up-to-date position and velocity vector information of other aircraft at the airport or in its immediate vicinity, or receives only the other aircraft position information. In the latter case, the Advisory Condition Detection Processing computes the other aircraft velocity vectors as a function of changes in the other aircraft position information over time. Alternatively, airport equipment, such as baggage carriers, fire trucks, and construction equipment, are equipped with a version of the airport situational awareness apparatus of the invention for broadcasting position information, including maximum height above runway information, so that installation aircraft operating on and around the airport are cognizant of the location of such hazards.

The Advisory Condition Detection Processing compares the own aircraft position and velocity vector with the positions and velocity vectors of other aircraft at the airport and in the vicinity, and determines potential conflicts using basic physics equations embodied in either well-known software programs or proprietary programs. If one or more potential conflict between the own aircraft and one or more other aircraft is determined, the Advisory Condition Detection Processing Block 18 generates an advisory to annunciate the potential conflict or conflicts. The Advisory Condition Detection Processing Block 18 generates output signals that stimulate the Aural Advisory Processing functional Block 20 that includes processing for aural advisory generation and prioritization and outputs an aural advisory signal to a cockpit audio device 22. According to another embodiment of the invention, the Advisory Condition Detection Processing Block 18 generates output signals that stimulate the Visual Advisory Processing functional Block 24 that includes processing for video advisory generation and prioritization and generates video output signals to the cockpit display device 26 that result in display of either or both of textual and pictographic information indicative of the potential conflict or conflicts.

The optional Other Aircraft Data Tracking Processing Block 30 shown in FIG. 1 is thus coupled to exchange in real-time changes in aircraft position and velocity status information via the Communications Hardware Processing Block 28 between the installation aircraft and other aircraft in the vicinity, if any. According to one embodiment, the Advisory Condition Detection Processing Block 18 output data are sent to a RS-232 I/O channel. An external circuit converts the serial data stream to Tone Modulation, which is broadcast over a short-range UHF FM radio represented by the Communications Hardware Processing Block 28. Broadcasts from other aircraft are received by the same radio, run through an inverse circuit, and received by the computer hosting at least the Advisory Condition Detection Processing Block 18 as a RS-232 data stream.

The overall amount of radio traffic processed by any given station is minimized by the RF band and transmit power being carefully chosen to limit the average distance of reception. Three factors drive such minimization. All traffic use the same RF frequency to minimize the complexity of the radio, minimize cost, and eliminates the need for crew intervention, i.e. tuning. A simple radio will have a low bit rate (300 to 1200 baud) because of the very narrow allocated bandwidth. Also, the number of transmitters will increase, on average, as the square of the reception distance. If a given message is 190 bit times, plus 50 to 100 ms of set-up time to clear squelch and Automatic Gain Control (AGC), the on-air time is 210 to 730 ms per message. Assuming a landing rate of 60 aircraft per hour per runway, and a worst-case runway density of 6 aircraft in a 3-mile radius, basic message traffic could be as high as two (entry/exit) every 10 seconds. With a 15-mile reception radius, the runway count increases to 12 and the on-air time increases to 2.5 seconds per message. If message time is on the order of 0.5 to 1 second, and conflicts require an exchange of messages to resolve, the reception radius needs to be small enough to allow 4 to 5 seconds per message.

Data Formatting

FIG. 13 shows a generally self-explanatory Table 400 that illustrates formatting of the serial data stream. According to one embodiment of the invention, an Aircraft ID $1^{st}$ byte 402 (2 places) employs six-bit character encoding=('ch', clamp to 0x20..0x5F)−0x20. Runway heading 404=01 to 36, as a function of assigned ID rather than magnetic heading. Runway ID 406 is formatted as: 00=no char, 01=Left, 02=Center, 03=Right. Altitude 408 is computed according to:

Altitude=((GeoAlt, clamped −2000 to +23,500)+2000+ 0.5 LSB)/100. Ground speed 410 is computed according to:

GndSpd=((TAGndSpd, clamped 0 to 511 kts)+0.5 LSB)/ 2. Track 412 is computed according to:

Track=(TATruTrk, clamped 0 to 357 deg)+0.5 LSB)/ 5.625. Latitude, LSB 414 (2 places) employs 24-bit fixed point real encoding=(long)(rVal/SCL), SCL=(180.0/ (1<<23)). Check Byte 416 indicates that no transmission errors occurred when the sum of all 19 bytes in packet equal zero.

Computer Program Product

In addition to being practiced as apparatus and methods, the present invention is also practiced as a computer program product for generating and annunciating the airport situational awareness advisories of the invention.

According to one embodiment of the invention, the airport situational awareness system of the invention is embodied in a computer program product for operation on an on-board processor, such as the processor 10 shown in FIG. 1. Accordingly, the computer program product includes a plurality of machine instructions that are retrieved and operated by the processor 10 for enabling the airport situational awareness system of the invention.

With reference to FIG. 1, the computer program product of the invention includes a computer-readable storage medium 32 readable by a medium reader 34, the computer-readable program code means being embodied in the storage medium 32. The medium reader 34 is coupled to the to the processor 10 via a memory device 36. Optionally, the computer-readable storage medium may be part of a memory device 36 for reading by the processor 10. The processor 10 of the present invention implements the computer-readable program code means for receiving sources of instrument signals reporting aircraft parameter state information and airport database information, and in response generating a plurality of airport situational awareness advisories, as described herein.

Figure 14:
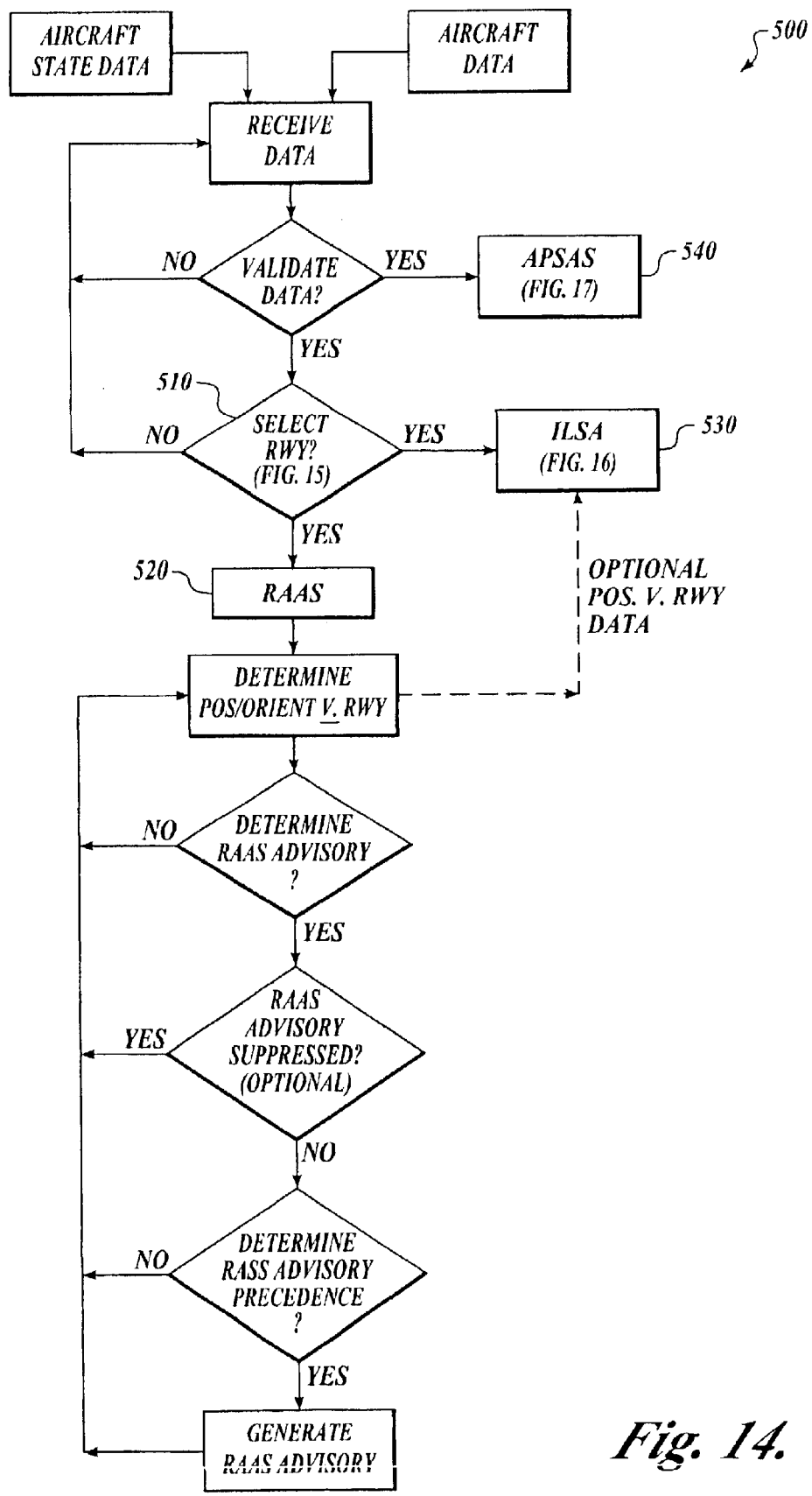
FIG. 14 is an exemplary flow diagram that illustrates the invention embodied as a computer program product for generating and annunciating the airport situational awareness advisories of the invention.

FIG. 14 is a flow diagram 500 that illustrates by example and without limitation the invention embodied as a computer program product for generating and annunciating the airport situational awareness advisories. Accordingly, the computer program product includes computer-readable program code means for operating the portions of the invention Runway Selection 510, the Runway Awareness and Advisory System (RAAS) 520, the Imminent Landing Situational Awareness (ILSA) 530, and the Aircraft Position Situational Awareness System (APSAS) 540, as described herein.

Figure 15:
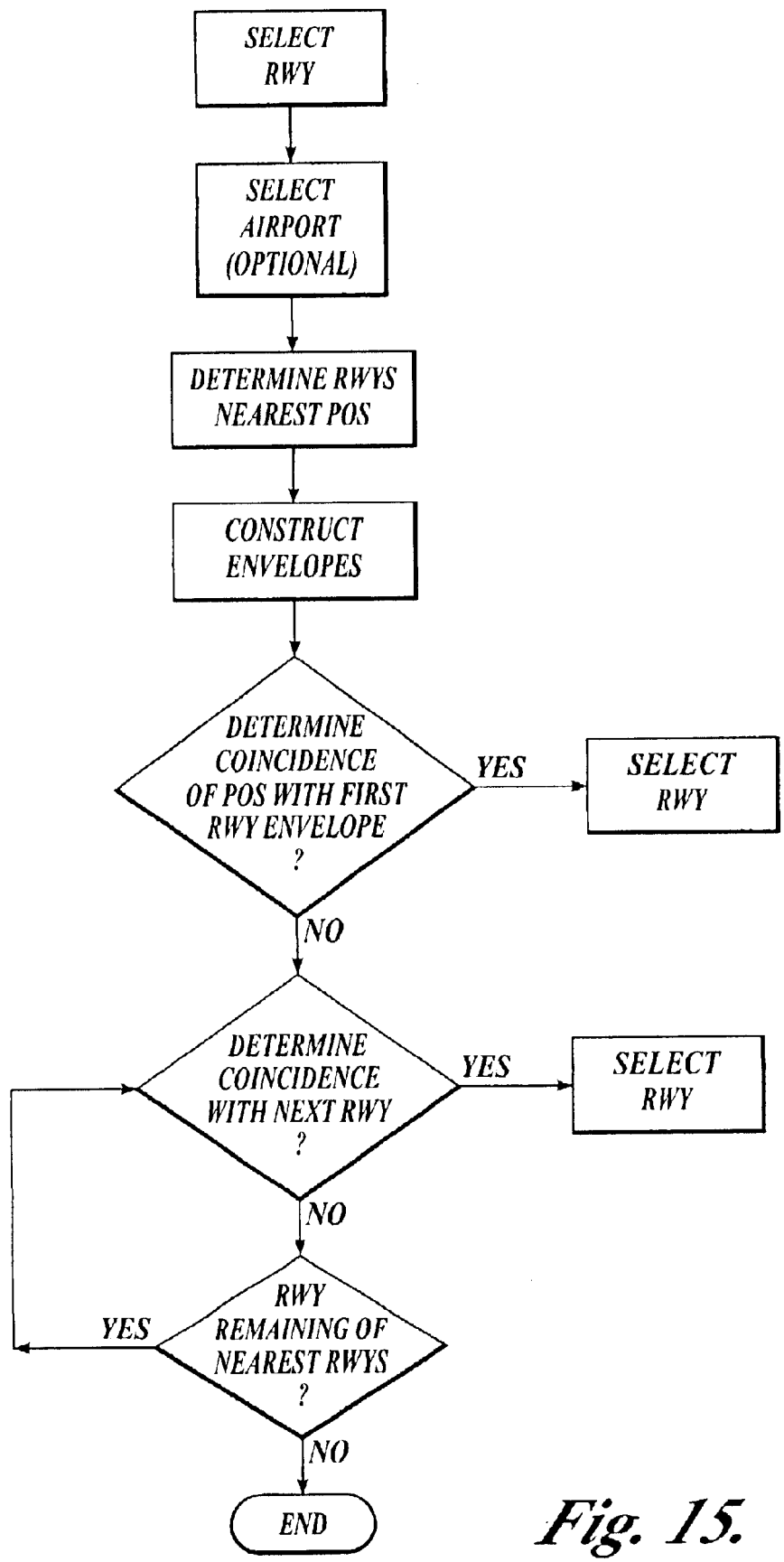
FIG. 15 is an exemplary flow diagram that illustrates the invention embodied as a computer program product for selecting or identifying a runway of interest.

FIG. 15: Runway Selection 510

The computer-readable program code means for generating and annunciating the airport situational awareness advisories of the invention includes a first computer-readable program code means for selecting or identifying a runway at an airport that the installation aircraft is most likely to encounter. The runway selection or identifying computer-readable program means includes:

a computer-readable program code means for receiving one or more instrument signals reporting a plurality of aircraft state parameters of interest, including position, orientation (a function of heading or track), altitude, ground speed, and phase of flight, including optionally computer-readable program code means for validating the information;

a computer-readable program code means for retrieving stored database information reporting a plurality of airport runway and taxiway (if available) information as a function of at least the position and orientation aircraft state parameters, including optionally computer-readable program code means for validating the information;

a computer-readable program code means for determining a plurality of airport runways nearest the current position of the installation aircraft;

a computer-readable program code means for constructing a runway envelope surrounding each of the airport runways; and a computer-readable program code means for determining the presence of the aircraft within one of the runway envelopes, for example, by comparing at least the aircraft position and orientation state parameters with each of the runway envelopes and determining coincidence of the position information with the runway envelope, and optionally alignment of the orientation information with a centerline of the runway within a pre-selected angular range.

According to one embodiment of the invention, the computer-readable program code means for constructing an envelope surrounding the airport runways includes computer-readable program code means for augmenting the envelope beyond the fixed runway dimensions as a function of an augmentation expansion having a magnitude that includes a fixed amount, an amount proportional to the width of the runway, and an amount proportional to the installation aircraft's ground speed in excess of a threshold. The computer-readable program code means for augmenting the envelope includes computer-readable program code means for computing the direction of the augmentation expansion as opposite to the aircraft heading or track. The computer-readable program code means for augmenting the envelope includes computer-readable program code means for computing the augmentation expansion length according to the Augmentation Expansion Length formula discussed herein. The computer-readable program code means for augmenting the envelope includes computer-readable program code means for computing the envelope's with and length according to the Box Width Component and Box Length Component, respectively, as discussed herein.

According to an alternative embodiment of the invention, the computer-readable program code means for constructing an envelope surrounding the airport runways relative to aircraft on the ground includes computer-readable program code means for augmenting the envelope beyond the fixed runway dimensions as a function of one or more quality factors that provide distance amounts by which the width and length of the runway are enlarged.

According to another alternative embodiment of the invention, the computer-readable program code means for constructing an envelope surrounding the airport runways relative to aircraft on approach for landing optionally includes computer-readable program code means for generating upper and lower glide paths relative to the end of the runway, and optionally includes computer-readable program code means for generating vertical and horizontal extensions by which the runway is augmented.

Runway Awareness and Advisory System (RAAS) 520

Returning to FIG. 14, the computer-readable program code means for generating and annunciating the airport situational awareness advisories of the invention includes a second computer-readable program code means for generating and annunciating the airport situational awareness advisories of the invention as a function of coincidence of the installation aircraft with the an envelope constructed around the selected runway according to the first computer-readable program code means for selecting or identifying a runway at an airport that the installation aircraft is most likely to encounter. The second computer-readable program code means for generating and annunciating the airport situational awareness advisories of the invention includes:

a computer-readable program code means for receiving information from the first computer-readable program means identifying the selected runway, including a position and orientation of the selected runway and the envelope constructed around the selected runway;

a computer-readable program code means for receiving current aircraft state information, including current altitude, ground speed, position, angular orientation, and phase of flight of the installation aircraft, wherein ground speed is optionally determined by computer-readable program code means for computing ground speed as a function of changes in current position with respect to time;

a computer-readable program code means for determining a coincidence of the installation aircraft with the selected runway by determining each of: a coincidence of the position of the installation aircraft with the envelope constructed around the selected runway, and an orientation of the installation aircraft with the selected runway; and a computer-readable program code means for generating a RAAS advisory annunciation relative to the selected runway as a function of: the current position and alignment of the installation aircraft with the selected runway, and the current phase of flight of the installation aircraft.

The computer-readable program code means for determining coincidence of the position of the installation aircraft with the envelope constructed around the selected runway includes computer-readable program code means for determining coincidence of a current latitude and longitude position of the installation aircraft with computed current latitude and longitude extents of the constructed envelope.

The computer-readable program code means for determining an orientation of the installation aircraft with the selected runway includes computer-readable program code means for determining an alignment of the installation aircraft with the selected runway within a selected angular limit of alignment. According to one embodiment of the invention, the computer-readable program code means for determining an alignment of the installation aircraft with the selected runway within a selected angular limit of alignment includes computer-readable program code means for determining alignment of the current track or heading of the installation aircraft with the centerline of the selected runway within selected angular limits.

According to one embodiment of the invention, the computer-readable program code means for generating a RAAS advisory annunciation includes means for generating one or more of a RAAS approach for landing advisory annunciation, an approaching runway during taxiing advisory annunciation, and an entering runway during taxiing advisory annunciation.

According to the one embodiment of the invention, the computer-readable program code means for generating a RAAS advisory annunciation includes means for generating a runway approach advisory annunciation during an approach for landing upon determining that the installation aircraft is: entering the envelope constructed around the selected runway by determining the coincidence within selected limits of the position of the installation aircraft with the centerline of the selected runway, aligned with the selected runway by determining the alignment within selected angular limits of the track or heading of the installation aircraft with the selected runway or the centerline of the selected runway, and approaching the selected runway for landing by determining the current phase of flight of the installation aircraft.

According to the one embodiment of the invention, the computer-readable program code means for generating a RAAS runway approach advisory annunciation during an approach for landing further includes computer-readable program code means for suppressing the runway approach advisory annunciation as a function of the installation aircraft altitude relative to the selected runway, i.e., the height above the selected runway. For example, the computer-readable program code means for suppressing the runway approach advisory annunciation includes computer-readable program code means for determining the height of the installation aircraft above a maximum height above the selected runway of, by example and without limitation, about 700 feet to 750 or 800 feet.

Additionally, the computer-readable program code means for suppressing the runway approach advisory annunciation as a function of the installation aircraft altitude relative to the selected runway includes computer-readable program code means for suppressing the runway approach advisory annunciation by determining the height of the installation aircraft below a minimum height above the selected runway of, by example and without limitation, about 300 feet.

Additionally, the computer-readable program code means for suppressing the runway approach advisory annunciation as a function of the installation aircraft altitude relative to the selected runway includes computer-readable program code means for suppressing the runway approach advisory annunciation by determining the height of the installation aircraft in a range about the normal Height Above Field call-outs, by example and without limitation determining the determining the height of the installation aircraft in a range above and below a height above the runway where one or more normal Height Above Field call-outs are annunciated.

According to the one embodiment of the invention, the computer-readable program code means for generating a RAAS runway approach advisory annunciation during an approach for landing further includes computer-readable program code means for announcing an available runway advisory of the runway length available for landing by, for example, accessing the database of airport information and retrieving the stored parameters of the selected runway; determining the position of the installation aircraft relative to one or both of the runway endpoints; computing the runway distance available for landing; and generating the available runway advisory of the runway length available for landing. Optionally, this computer-readable program code means for generating a RAAS available runway advisory further includes computer-readable program code means for generating the advisory as a function of the aircraft category, whereby the runway length available for landing is compared with a nominal runway landing length specified for the installation aircraft category, and the RAAS available runway advisory is generated if the nominal runway landing length specified for the installation aircraft category exceeds the runway length available for landing. Otherwise, the RAAS available runway advisory generation is suppressed.

According to the one embodiment of the invention, the computer-readable program code means for generating an on-ground RAAS advisory annunciation includes computer-readable program code means for generating the on-ground advisories on approaching and entering a runway, unless the installation aircraft is on a runway and aligned with it, and the groundspeed of the installation aircraft is greater than a threshold ground speed, by example nominally selected as about 40–60 knots. Accordingly, if all three of these conditions are met, the on-ground RAAS advisory annunciations are suppressed.

According to the one embodiment of the invention, the computer-readable program code means for generating a RAAS advisory annunciation includes computer-readable program code means for generating an on-ground runway approach advisory annunciation during taxiing upon determining that the installation aircraft is entering the envelope constructed around the selected runway by determining that: the position of the installation aircraft coincides with the envelope constructed around the selected runway; and the installation aircraft is on the ground by determining that: the installation aircraft is configured in a taxiing phase of flight, the installation aircraft is traveling at a ground speed that is less than a selected threshold ground speed, or the installation aircraft has a current altitude that is less than a selected threshold altitude.

According to the one embodiment of the invention, the computer-readable program code means for generating a RAAS advisory annunciation includes means for generating an on-ground runway entry advisory annunciation upon determining that:

the installation aircraft is entering the envelope constructed around the selected runway by determining the coincidence within selected limits of the position of the installation aircraft with the centerline of the selected runway;

the installation aircraft is aligned with the selected runway by determining the alignment within selected limits of the track or heading of the installation aircraft with the selected runway or the centerline of the selected runway; and the installation aircraft is on the ground by determining that: the installation aircraft is configured in a take-off phase of flight, the installation aircraft is traveling at a ground speed that is less than a selected threshold ground speed, or the installation aircraft has a current altitude that is less than a selected threshold altitude.

According to one embodiment, the computer-readable program code means for generating a runway entry advisory annunciation includes means for identifying the runway entered by, for example, determining the current position of the installation aircraft relative to a midpoint of the runway. According to one embodiment, the computer-readable program code means for identifying the runway entered includes computer-readable program code means for determining the orientation, i.e., the heading or track, of the installation aircraft relative to the runway or the envelope constructed around the runway.

According to the one embodiment of the invention, the computer-readable program code means for generating a RAAS runway entry advisory annunciation during taxiing, further includes computer-readable program code means for generating one or more Extended Holding On Runway RAAS advisory annunciation when the position of the installation aircraft has remained unchanged within selected physical limits relative to the selected runway or runway envelope for a time period in excess of one or more selected threshold time periods. According to one embodiment of the invention, the computer-readable program code means for generating one or more Extended Holding On Runway RAAS advisory annunciation include computer-readable program code means for generating one or more repeat RAAS runway entry advisory annunciations that are spaced apart in time by selectable intervals.

According to one embodiment of the invention, the computer-readable program code means for generating a RAAS advisory annunciation means for generating a runway approach advisory annunciation during taxiing includes computer-readable program code means for generating a crossing runway RAAS advisory annunciation upon determining that: the runway entry advisory annunciation has been generated relative to a first selected runway; the installation aircraft is approaching a second selected runway by determining that the installation aircraft is entering the envelope constructed around the selected runway, for example, by determining that the position of the installation aircraft coincides with the envelope constructed around the selected runway. According to one embodiment of the computer-readable program code means for generating a crossing runway RAAS advisory annunciation further includes computer-readable program code means for determining that the installation aircraft is on the ground by determining that it is traveling at a ground speed less than a threshold ground speed, or is traveling at a height above the runway below a maximum threshold height.

According to one embodiment of the invention, the computer-readable program code means for generating a RAAS advisory annunciation optionally includes computer-readable program code means for generating a leaving runway advisory annunciation during taxiing, the computer-readable program code means including computer-readable program code means for determining that: the runway entry advisory annunciation has been generated relative to a selected runway, and the installation aircraft is leaving the selected runway by determining that the installation aircraft is leaving the envelope constructed around the selected runway, for example, by determining that the position of the installation aircraft coincides with the area outside the bounds of the envelope constructed around the selected runway.

Other RAAS Airport Situational Awareness Advisories

According to one embodiment of the invention, the computer-readable program code means for generating a RAAS advisory annunciation includes computer-readable program code means for generating an imminent taxiway take-off advisory annunciation by, for example, determining that the installation aircraft is on the ground and traveling at a ground speed greater than a threshold ground speed, and determining that at least one of two conditions is not satisfied: that the installation aircraft is on the selected runway and aligned with the runway. Optionally, the computer-readable program code means for determining that the condition is not satisfied that the installation aircraft is on the selected runway includes determining that the installation aircraft position is outside the bounds of the envelope constructed around the selected runway. The computer-readable program code means for generating a RAAS imminent taxiway take-off advisory annunciation includes further means for generating as a function of such a determination an advisory representative of an imminent take-off from a taxiway, such as, "On taxiway, on taxiway."

Optionally, the second computer-readable program code means for generating and annunciating the airport situational awareness advisories of the invention includes computer-readable program code means for generating an imminent short or "wrong" runway take-off advisory when the length of the current runway is less than a nominal take-off field length for the category of the installation aircraft. The computer-readable program code means for generating an imminent short runway take-off advisory includes, by example and without limitation, computer-readable program code means for determining as a function of current aircraft position according to GPS latitude and longitude, aircraft heading, and a nominal take-off field length for the installation aircraft category that the length of the selected runway, or the length of the runway remaining for take-off, is shorter than a selected range of field length required for safe operation of the installation aircraft. For example, the computer-readable program code means for generating an imminent short runway take-off advisory includes computer-readable program code means for generating the advisory responsively to computer-readable program code means for determining that runway length remaining is less than the nominal take-off field length required.

The computer-readable program code means for generating an imminent short runway take-off advisory includes computer-readable program code means for generating at intervals an advisory representative of the length of runway remaining for take-off in selected increments until the length of runway remaining for take-off is determined to be less than a minimum length, given that: the aircraft is determined to be on the runway, as described herein; the aircraft ground speed is greater than a threshold ground speed selected for example as being a nominal value of about 40 knots; and the aircraft position is past the midpoint of the runway, i.e., on a last half of the runway, unless an Aborted or Rejected Takeoff is detected, as described herein. Unless the ground speed falls by a selected amount below the maximum ground speed attained thereby indicating a Rejected Takeoff, the computer-readable program code means generates an advisory representative of the length of runway remaining for take-off at near the end of the runway. For example, the computer-readable program code means generates an advisory representative of the length of runway remaining for take-off at a remaining length of 500 feet and 100 feet.

According to one embodiment of the invention, the second computer-readable program code means for generating and annunciating the airport situational awareness advisories includes computer-readable program code means for generating advisories reporting the length of runway remaining before the end of the runway in selectable increments of 1000 feet after the installation aircraft passes a midpoint in the length of the selected runway, and further for generating the length of runway remaining advisories for reporting the remaining lengths of 500 feet and 100 feet.

Figure 16:
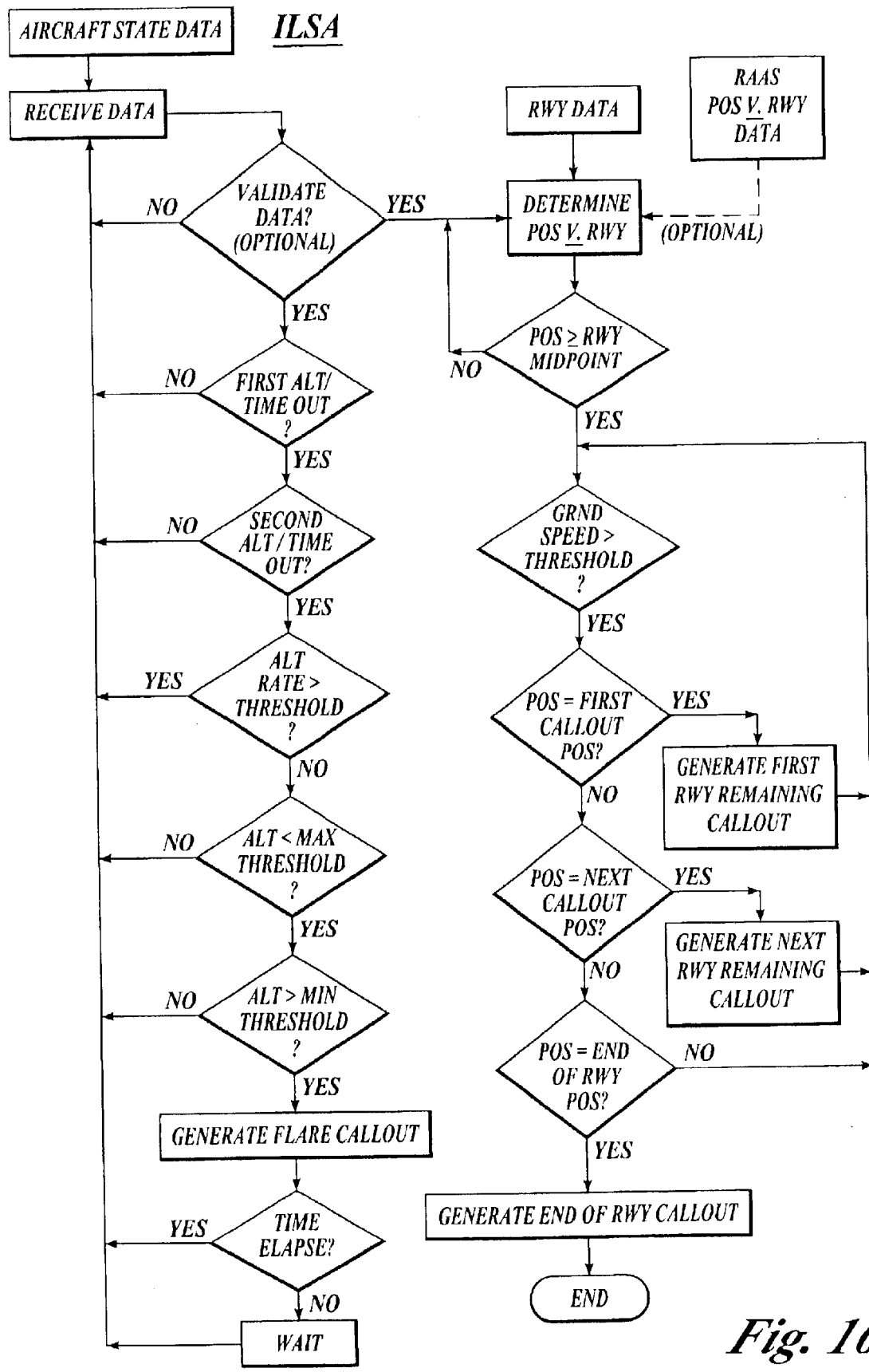
FIG. 16 is an exemplary flow diagram that illustrates the invention embodied as a computer program product for generating flare altitude callouts of the invention.

FIG. 16: Imminent Landing Situational Awareness (ILSA) 530

The computer-readable program code means for generating and annunciating the airport situational awareness advisories of the invention includes a third computer-readable program code means for generating and annunciating the airport situational awareness advisories of the invention as a function of a flare altitude monitor computer-readable program code means for determining that landing the installation aircraft has not been completed within specified conditions. Accordingly, the computer-readable program code means for generating and annunciating the airport situational awareness advisories includes computer-readable program code means for determining that: the installation aircraft is currently configured in a landing phase of flight; the installation aircraft is not currently climbing at a altitude rate in excess of a threshold altitude rate; and as a function of height above runway, the installation aircraft has not currently touched-down; and further includes computer-readable program code means, responsive to determining that the installation aircraft has not touched-down, for generating at periodic intervals flare callouts that report current height above the runway to the nearest foot.

The computer-readable program code means for generating periodic flare callouts further includes computer-readable program code means for suppressing the periodic flare callouts upon determining that: the ground speed of the installation aircraft is reduced below a minimum threshold ground speed; or the installation aircraft altitude rate exceeds a minimum threshold altitude rate, i.e., indicating a go-around; or the aircraft altitude is reduced below a maximum threshold altitude that indicates it is on the ground. According to one embodiment, the computer-readable program code means for determining that the installation aircraft is currently in a landing phase of flight further includes first computer-readable program code means for determining that the installation aircraft height above the runway (radio altitude AGL) is less than a first maximum height above the runway for a first minimum time period; and second computer-readable program code means for determining that the installation aircraft height above the runway (radio altitude AGL) is less than a second maximum height above the runway less than the first maximum height for a second minimum time period that is optionally less than the first minimum time period.

Additionally, the computer-readable program code means for generating periodic flare callouts further includes computer-readable program code means for determining that additional conditions are satisfied, and thereafter generating runway distance remaining callouts. Accordingly, the computer-readable program code means for generating periodic flare callouts further includes computer-readable program code means for retrieving stored runway information retrieved from the Airport Database; retrieving GPS position information, and optionally, heading information; computing the aircraft position relative to the end of the runway; and generating at selected intervals along the runway advisories representative of the remaining runway distance. For example, the remaining runway distance advisories are generated for 3000, 2000, 1000, and 500 feet of remaining runway length that indicates the end of the runway. Additionally, the computer-readable program code means for generating remaining runway distance advisories further includes computer-readable program code means for suppressing the remaining runway distance advisories, unless comparing the aircraft orientation and position relative to the selected runway indicates that the aircraft has passed a midway point in traveling toward the end of the runway.

According to one embodiment, the computer-readable program code means for generating remaining runway distance advisories further includes computer-readable program code means for suppressing the remaining runway distance advisories under conditions that reduce or eliminate nuisance warnings. Accordingly, the computer-readable program code means includes computer-readable program code means for suppressing the remaining runway distance advisories after the remaining runway distance advisories are generated a first time, and includes computer-readable program code means for suppressing the remaining runway distance advisories if the aircraft ground speed is reduced below a selected safe threshold, by example nominally selected as about 40 to 60 knots.

Figure 17:
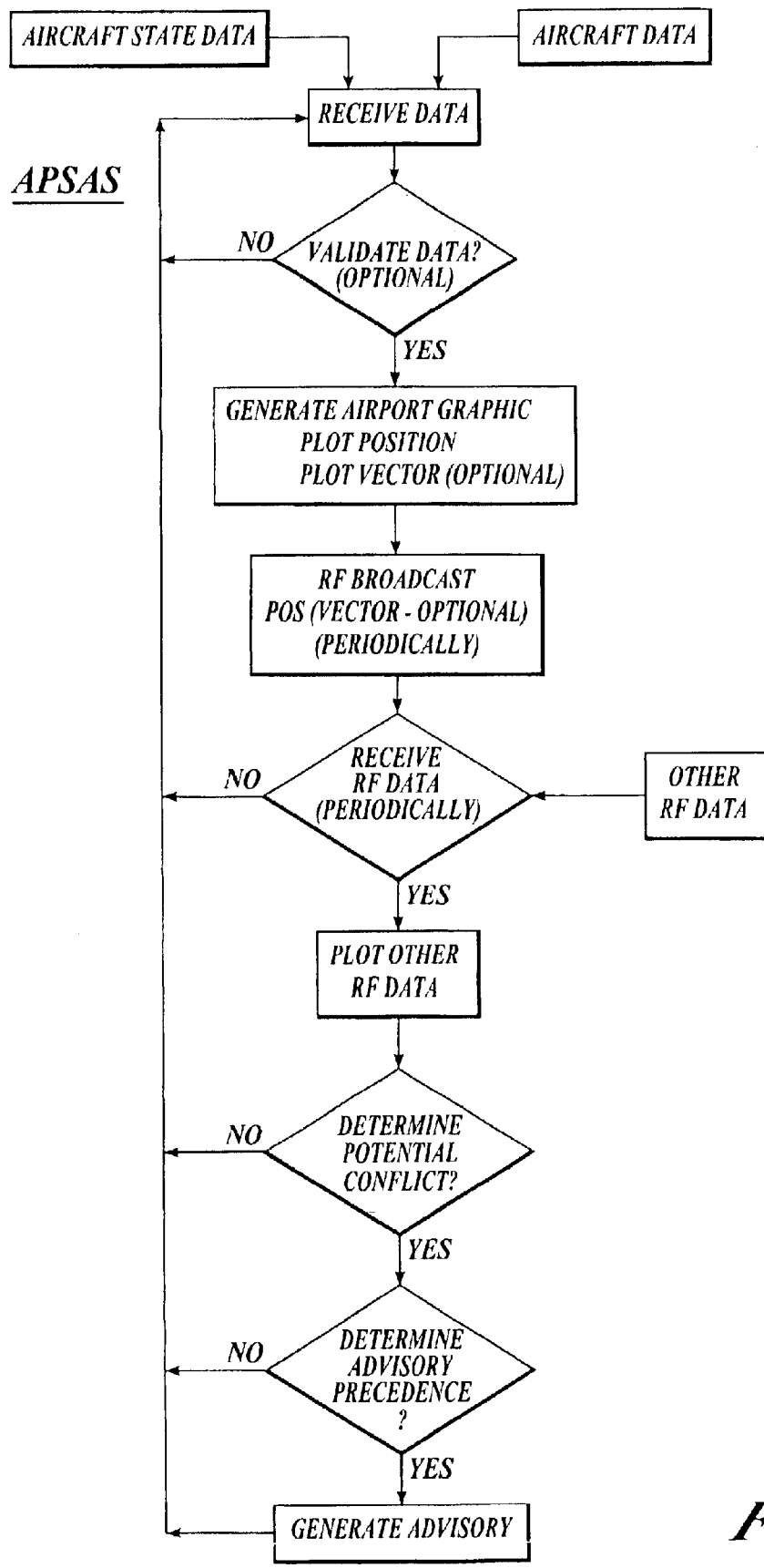
FIG. 17 is an exemplary flow diagram that illustrates the present invention embodied as a computer program product for indicating a current position of the installation aircraft relative to a selected airport, and optionally generating the airport situational awareness advisories of the invention as a function of potential conflicts.

FIG. 17: Aircraft Position Situational Awareness System (APSAS) 540

The computer-readable program code means for generating and annunciating the airport position situational awareness advisories of the invention includes a fourth computer-readable program code means for indicating a current position of the installation aircraft relative to a selected airport; optionally broadcasting a RF message representative of the installation aircraft's position and optionally a velocity vector containing its heading and ground speed; optionally receiving one or more RF messages broadcast by other installation aircraft and containing information representative of the other installation aircraft position, and optionally containing a velocity vector containing other installation aircraft heading and ground speed information; optionally computing potential conflicts as a function of the received RF message information; and optionally generating an advisory as a function of computing potential conflicts.

According to one embodiment of the invention, the computer-readable program code means for indicating a current position of the installation aircraft relative to a selected airport includes computer-readable program code means for retrieving airport information from a database of stored airport information and generating a graphical depiction of the airport information for display on a cockpit display device;

a computer-readable program code means for receiving current aircraft state information, including current altitude, ground speed, position, angular orientation, and phase of flight of the installation aircraft, wherein ground speed is optionally determined by computer-readable program code means for computing ground speed as a function of changes in current position with respect to time; and a computer-readable program code means for generating a plot the current position information of the installation aircraft relative to the graphical depiction of the airport information for display on the cockpit display device.

According to one embodiment of the invention, the computer-readable program code means for indicating a current position of the installation aircraft relative to a selected airport includes computer-readable program code means for computing a current velocity vector of the installation aircraft as a function of the current ground speed and angular orientation of the installation aircraft relative to the selected airport; and the computer-readable program code means for generating a plot the current position information of the installation aircraft relative to the graphical depiction of the airport information includes computer-readable program code means for generating a plot the current velocity vector of the installation aircraft relative to the graphical depiction.

According to one embodiment of the invention, the computer-readable program code means for indicating a current position of the installation aircraft relative to a selected airport also includes a computer-readable program code means for generating an RF broadcast of the current position information, and optionally includes a computer-readable program code means for periodically generating a RF broadcast of the current velocity vector of the installation aircraft.

According to one embodiment of the invention, the computer-readable program code means for indicating a current position of the installation aircraft relative to a selected airport also includes computer-readable program code means for receiving one or more RF broadcasts of current position of other installed devices operating the APSAS computer program product of the invention, including other installation aircraft, installation vehicles, installation equipment and installation obstacles; and further includes: a computer-readable program code means for generating a plot of the current position information of the other installation aircraft relative to the graphical depiction of the airport information.

According to one embodiment of the invention, the computer-readable program code means for indicating a current position of the installation aircraft relative to a selected airport also includes computer-readable program code means for generating a plot of a current velocity vector of the other installation aircraft relative to the graphical depiction, wherein the current velocity vector of the other installation aircraft is received as a RF broadcasts of current velocity vector of the other installation aircraft, or optionally the current velocity vector of the other installation aircraft is computed according to computer-readable program code means for computing a current velocity vector of the other installation aircraft as a function of the current position information of the other installation aircraft.

According to one embodiment of the invention, the computer-readable program code means for indicating a current position of the installation aircraft relative to a selected airport also includes computer-readable program code means for computing a potential conflict between the own installation aircraft and other installation aircraft, equipment and fixed obstacles. The potential conflicts are computed, by example and without limitation, as: projecting of the own installation aircraft position and velocity vector, projecting of the other installation aircraft, vehicles, equipment and fixed obstacle positions and velocity vectors; and determining an intersection of the own installation aircraft position and velocity vector with any one or more of the other installation aircraft, equipment and fixed obstacle positions and velocity vectors.

According to one embodiment of the invention, the computer-readable program code means for indicating a current position of the installation aircraft relative to a selected airport also includes computer-readable program code means for determining priority of a potential conflict condition advisory relative to other advisories and alerts, and a computer-readable program code means, operable if the potential conflict condition advisory takes precedence, for generating an advisory indicating as appropriate that: a runway being approached or entered is occupied by another vehicle or other airport equipment; a runway being approached or entered is being vacated by other vehicle; and another vehicle is approaching or entering a runway currently occupied by the installation aircraft.

While the preferred embodiment of the invention has been illustrated and described, it will be appreciated that various changes can be made therein without departing from the spirit and scope of the invention.

What is claimed is:

1. A runway awareness computer program residing on a computer usable storage medium, the computer program comprising:

computer-readable program code means for receiving one or more signals representative of updated aircraft state parameter information; and computer-readable program code means for accessing stored runway survey information as a function of the updated aircraft state parameter information;

computer-readable program code means for identifying a runway as a function of the updated aircraft state parameter information and the runway survey information;

computer-readable program code means for determining that the aircraft has encountered the identified runway;

computer-readable program code means for determining an orientation of the aircraft relative to the identified runway as a function of the updated aircraft state parameter information and the runway survey information;

computer-readable program code means for generating a runway awareness advisory as a function of: the updated aircraft state parameter information, and the orientation of the aircraft relative to the identified runway.

2. The computer program of claim 1 wherein the computer-readable program code means for determining that the aircraft has encountered the identified runway further comprises:

computer-readable program code means for constructing an augmentation envelope around the runway; and computer-readable program code means for comparing the aircraft position with the augmentation envelope.

3. The computer program of claim 2 wherein the computer-readable program code means for constructing an augmentation envelope around the runway further comprises computer-readable program code means for constructing the augmentation envelope as a function of a heading and a ground speed of the aircraft.

4. The computer program of claim 1 wherein the computer-readable program code means for determining an orientation of the aircraft relative to the identified runway further comprises computer-readable program code means for determining the relative orientation of the aircraft upon encountering the identified runway.

5. The computer program of claim 1, further comprising computer-readable program code means for suppressing the runway awareness advisory as a function of altitude of the aircraft relative to the identified runway.

6. The computer program of claim 1 wherein the computer-readable program code means for generating a runway awareness advisory further comprises computer-readable program code means for generating a runway awareness advisory as a function of updated aircraft position, ground speed, orientation, and phase of flight state parameter information.

7. The computer program of claim 1, further comprising computer-readable program code means for prioritization of the runway awareness advisory relative to one or more other aircraft advisories and alerts.

8. The computer program of claim 1, further comprising computer-readable program code means for suppressing the runway awareness advisory as a function of the computer-readable program code means for generating a runway awareness advisory generating a prior runway awareness advisory.

9. A computer program product, comprising:

a computer-usable medium having computer-readable code embodied therein for configuring a computer processor, the computer program product comprising:

computer-readable code configured to cause a computer processor to receive at intervals samples of one or more instrument signals reporting updated aircraft position, ground speed, orientation, and phase of flight information;

computer-readable code configured to cause a computer processor to retrieve runway survey information corresponding to each of a plurality of runways from an on-board database as a function of at least the updated aircraft position information;

computer-readable code configured to cause a computer processor to construct an augmented annunciation envelope encompassing one or more of the plurality of runways individually as a function of the corresponding runway survey information, the aircraft ground speed information and the aircraft orientation information; and computer-readable code configured to cause a computer processor to generate an airport situational awareness advisory as a function of a coincidence of the updated aircraft position with the augmented annunciation envelope encompassing one of the runways and an alignment of the updated aircraft orientation relative to a centerline of the runway corresponding to the augmented annunciation envelope coincident with the updated aircraft position.

10. The computer program product of claim 9 wherein the computer-readable code configured to cause a computer processor to retrieve runway survey information corresponding to each of a plurality of runways from an on-board database as a function of at least the updated aircraft position information further comprises computer-readable code configured to cause a computer processor to retrieve runway survey information corresponding to runways determined as a function of the updated aircraft position information to be within a selected range of the aircraft.

11. The computer program product of claim 9 wherein the computer-readable code configured to cause a computer processor to generate an airport situational awareness advisory further comprises computer-readable code configured to cause a computer processor to generate one of: an airborne airport situational awareness advisory, and an on-ground airport situational awareness advisory.

12. The computer program product of claim 11 wherein the computer-readable code configured to cause a computer processor to generate an on-ground airport situational awareness advisory further comprises computer-readable code configured to cause a computer processor to generate, as a function of the updated aircraft position and orientation relative to a centerline of the runway, one of: a runway approach advisory, and a runway entry advisory.

13. The computer program product of claim 11 wherein the computer-readable code configured to cause a computer processor to generate an on-ground airport situational awareness advisory further comprises computer-readable code configured to cause a computer processor to suppress the on-ground airport situational awareness advisory under conditions such that:

the updated aircraft position is coincident with the augmented annunciation envelope encompassing one of the runways, the updated aircraft orientation is aligned within selected angular limits to a centerline of the runway corresponding to the augmented annunciation envelope coincident with the updated aircraft position, and the updated aircraft ground speed is greater than a threshold ground speed.

14. The computer program product of claim 11 wherein the computer-readable code configured to cause a computer processor to generate an on-ground airport situational awareness advisory further comprises computer-readable code configured to cause a computer processor to generate an advisory representative of an immanent take-off from a taxiway under conditions such that:

the updated aircraft ground speed is greater than a threshold ground speed, and the aircraft is not on a runway, as determined by at least one of:

the updated aircraft position is outside the bounds of all the augmented annunciation envelopes, and the updated aircraft orientation is angled at greater than a selected angular limit to a centerline of the runway corresponding to an augmented annunciation envelope coincident with the updated aircraft position.

15. The computer program product of claim 11 wherein the computer-readable code configured to cause a computer processor to generate an airborne airport situational awareness advisory further comprises computer-readable code configured to cause a computer processor to generate the airborne airport situational awareness advisory during a terminal phase of flight relative to a runway having an augmented annunciation envelope coincident with the updated aircraft position and a centerline aligned with the updated aircraft orientation within selected angular limits.

16. The computer program product of claim 15 wherein the computer-readable code configured to cause a computer processor to generate an airborne airport situational awareness advisory further comprises computer-readable code configured to cause a computer processor to suppress the airborne airport situational awareness advisory for heights above the runway greater than a selected height above the runway.

17. The computer program product of claim 15 wherein the computer-readable code configured to cause a computer processor to generate an airborne airport situational awareness advisory further comprises computer-readable code configured to cause a computer processor to suppress the airborne airport situational awareness advisory for heights above the runway within a selected range of heights above the runway.

18. The computer program product of claim 15 wherein the computer-readable code configured to cause a computer processor to generate an airborne airport situational awareness advisory further comprises computer-readable code configured to cause a computer processor to suppress the airborne airport situational awareness advisory after the airborne airport situational awareness advisory is generated a first time.

19. The computer program product of claim 15 wherein the airborne airport situational awareness advisory further comprises information identifying the runway.

20. The computer program product of claim 15 wherein:
the runway survey information further comprises a runway endpoint; and
the computer-readable code configured to cause a computer processor to generate an airborne airport situational awareness advisory further comprises computer-readable code configured to cause a computer processor to:
determine the updated aircraft position relative to the runway endpoint;
compute a runway length available for landing; and
generate an advisory of the runway length available for landing.

21. The computer program product of claim 15 wherein the computer-readable code configured to cause a computer processor to generate an advisory of the runway length available for landing further comprises computer-readable code configured to cause a computer processor to generate the advisory as a function of a selected nominal runway length for a selected aircraft category.

22. The computer program product of claim 9, further comprising a computer processor coupled to access the computer-readable code and structured for executing the code.

23. A runway awareness advisory apparatus, comprising:
a database of runway survey data;
a processor structured for receiving samples of one or more signals reporting one or more different aircraft state parameter data and for retrieving runway survey data from the database; and
one or more algorithms executable by the processor for generating, as a function of one or more of the aircraft state parameter data and the retrieved runway survey data, one of a plurality of different runway awareness advisories.

24. The apparatus of claim 23 wherein the algorithms executable by the processor further comprise algorithms resident on the processor.

25. The apparatus of claim 23 wherein the algorithms executable by the processor further comprise algorithms for retrieving from runway survey data from the database runway survey data describing one or more different runways as a function of a current position of an aircraft having the processor installed thereon.

26. The apparatus of claim 25 wherein the algorithms executable by the processor further comprise algorithms for constructing a plurality of envelopes each surrounding an individual runway.

27. The apparatus of claim 26 wherein the algorithms executable by the processor for constructing envelopes surrounding each individual runway further comprise algorithms for constructing the envelopes as having a maximum height-above-runway vertical extension limitation.

28. The apparatus of claim 26 wherein the algorithms executable by the processor for constructing a plurality of envelopes each surrounding an individual runway further comprises algorithms for constructing each of the envelopes as a function of the runway dimensions, a current ground speed of the aircraft, and a current heading of the aircraft.

29. The apparatus of claim 26 wherein the algorithms executable by the processor for generating one of a plurality of different runway awareness advisories further comprise algorithms executable by the processor for generating a runway awareness advisory representative of an immanent take-off from a taxiway as a function of:
determining that a current aircraft ground speed is greater than a threshold ground speed; and
determining one of:
that a current aircraft position is not within bounds of an envelope surrounding an individual runway, and
that a current aircraft heading is skewed at greater than a selected angular limit to a runway corresponding to an envelope containing the current aircraft position.

30. The apparatus of claim 26 wherein the algorithms executable by the processor further comprise algorithms for selecting one of the runways as a function of a current position of the aircraft being contained within an envelope surrounding the runway.

31. The apparatus of claim 30 wherein the algorithms executable by the processor further comprise algorithms for constructing envelopes surrounding each individual runway further comprise algorithms for constructing each envelope having a fan-shaped extension projected from one end of the runway.

32. The apparatus of claim 30 wherein the algorithms executable by the processor for generating one of a plurality of different runway awareness advisories further comprise algorithms for generating one of the runway awareness advisories as a function of an orientation of a current heading of the aircraft relative to the selected runway.

33. The apparatus of claim 32 wherein the algorithms executable by the processor further comprise algorithms for suppressing the generating of a runway awareness advisory when the combined current aircraft position, heading and ground speed indicate that the aircraft is currently in a take-off phase of flight.

34. An apparatus for generating a runway awareness advisory, the apparatus comprising:
 a searchable database of stored runway survey information;
 a source of a plurality of instrument data signals each reporting updated aircraft state parameter data;
 a memory having a plurality of machine instructions stored therein, the machine instructions being executable by a processor for generating one of a plurality of different runway awareness advisories as a function of airport survey information retrieved from the searchable database and one or more of the updated aircraft state parameter data; and
 a processor coupled to receive the updated aircraft state parameter data and coupled to the memory for retrieving the machine instructions, the processor being structured to operate the machine instructions for:
  determining as a function of the updated aircraft state parameter data one or more of a current aircraft position, ground speed, heading, phase of flight, and altitude,
  accessing the searchable database for retrieving runway survey information as a function of the current aircraft position,
  constructing an envelope individually around each of a plurality of runways as a function of the runway survey data and the current aircraft position, ground speed and heading, and
  generating one of the plurality of different runway awareness advisories as a function of determining a coincidence of the current aircraft position with the envelope around one of the runways, and determining an angle between the current aircraft heading and a centerline of the runway.

35. The apparatus of claim 34 wherein the processor is further structured to operate the machine instructions for determining a current height of the aircraft above the runway as a function of the current aircraft altitude and the runway survey data.

36. The apparatus of claim 34 wherein the machine instructions for constructing an envelope around each of the runways further comprise machine instructions for limiting each of the envelopes to a maximum height above the runway above which the generating of the runway awareness advisories is suppressed.

37. The apparatus of claim 34 wherein the machine instructions for constructing an envelope around each of the runways further comprise machine instructions for constructing an extension of each envelope extending for a selected distance from an end of the runway along a centerline of the runway.

38. The apparatus of claim 37 wherein the machine instructions for extending each envelope a selected distance from an end of the runway further comprise machine instructions for constructing the extension limited by selected upper and lower glidepaths.

39. The apparatus of claim 37 wherein the machine instructions for extending each envelope a selected distance from an end of the runway further comprise machine instructions for constructing the extension limited by selected suppression zones corresponding to a range of heights above the runway.

40. The apparatus of claim 34 wherein the processor is further structured to operate the machine instructions for generating a runway awareness advisory representative of an imminent taxiway take-off under conditions indicating imminent take-off and the current aircraft position is outside the bounds of each of the envelopes.

41. The apparatus of claim 34 wherein the processor is further structured to operate the machine instructions for generating a runway awareness advisory representative of an imminent taxiway take-off under conditions indicating imminent take-off and the angle between the current aircraft heading and the runway centerline is greater than a selected threshold angle.

* * * * *